(12) United States Patent
Azodi

(10) Patent No.: US 10,911,584 B2
(45) Date of Patent: *Feb. 2, 2021

(54) PHONE CASE WITH INTERCHANGEABLE COSMETIC ACCESSORY ATTACHMENT SYSTEM

(71) Applicant: Innovative Music, LLC, Las Vegas, NV (US)

(72) Inventor: Shervin Azodi, Irvine, CA (US)

(73) Assignee: Innovative Music, LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/521,468

(22) Filed: Jul. 24, 2019

(65) Prior Publication Data

US 2019/0343260 A1    Nov. 14, 2019

Related U.S. Application Data

(63) Continuation of application No. 15/426,585, filed on Feb. 7, 2017, now Pat. No. 10,404,310.

(Continued)

(51) Int. Cl.
| | |
|---|---|
| *H04M 1/02* | (2006.01) |
| *H04B 1/3888* | (2015.01) |
| *A45D 34/04* | (2006.01) |
| *A45D 40/26* | (2006.01) |
| *A45D 34/06* | (2006.01) |
| *A45D 40/24* | (2006.01) |
| *A45D 33/00* | (2006.01) |

(Continued)

(52) U.S. Cl.
CPC .......... *H04M 1/0254* (2013.01); *A45C 11/00* (2013.01); *A45D 33/008* (2013.01); *A45D 34/042* (2013.01); *A45D 34/06* (2013.01); *A45D 40/22* (2013.01); *A45D 40/222* (2013.01); *A45D 40/24* (2013.01); *A45D 40/262* (2013.01); *A45D 42/02* (2013.01); *H04B 1/3888* (2013.01);

(Continued)

(58) Field of Classification Search
CPC ... H04W 88/00–06; H04M 1/00–0285; H04M 1/185; H04M 1/21; H04B 1/3888
See application file for complete search history.

(56) References Cited

U.S. PATENT DOCUMENTS

| 8,639,288 B1 * | 1/2014 | Friedman | ................ | A61M 5/20 455/556.1 |
|---|---|---|---|---|
| 8,833,379 B1 * | 9/2014 | Kaplan | .................. | A45D 33/26 132/287 |

(Continued)

FOREIGN PATENT DOCUMENTS

KR    10-2013-0127278    11/2013

OTHER PUBLICATIONS

Extended European Search Report for European Application No. 17169739.4 dated Nov. 2, 2017.

*Primary Examiner* — San Htun
(74) *Attorney, Agent, or Firm* — Knobbe Martens Olson & Bear, LLP

(57) ABSTRACT

A mobile phone case with interchangeable, removable and attachable modular make-up and cosmetics. Various embodiments of interchangeable accessory attachments include cosmetic make up compartment, cosmetics, make-up, blush, foundation, primer, lip coloring, lip gloss, lip stick, mascara, eye liner, eye shadow, lotion, skin conditioner, acne medication, tools for application, tools for removal, brush, swab, make-up pencil, make-up pen, highlighting instrument, glitter, ink, implement, pad, wipe, and/ or any other make-up related accessory.

13 Claims, 25 Drawing Sheets

Related U.S. Application Data

(60) Provisional application No. 62/384,030, filed on Sep. 6, 2016.

(51) Int. Cl.

| | |
|---|---|
| *A45D 40/22* | (2006.01) |
| *A45C 11/00* | (2006.01) |
| *A45D 42/02* | (2006.01) |
| *A45D 33/28* | (2006.01) |

(52) U.S. Cl.
CPC ..... H04M 1/0202 (2013.01); *A45C 2011/002* (2013.01); *A45D 33/28* (2013.01); *A45D 2040/224* (2013.01); *A45F 2200/0516* (2013.01)

(56) References Cited

U.S. PATENT DOCUMENTS

| | | |
|---|---|---|
| 9,241,051 B1 | 1/2016 | Peterson, III |
| 2009/0166247 A1* | 7/2009 | Gindi ................... A45D 33/008 206/581 |
| 2013/0061867 A1* | 3/2013 | Kim ....................... A45D 33/25 132/293 |
| 2013/0069499 A1 | 3/2013 | Modrell |
| 2014/0217866 A1 | 8/2014 | Harris |
| 2014/0228082 A1 | 8/2014 | Morrow et al. |
| 2015/0072200 A1* | 3/2015 | Huang ................. H01M 10/46 429/92 |

* cited by examiner

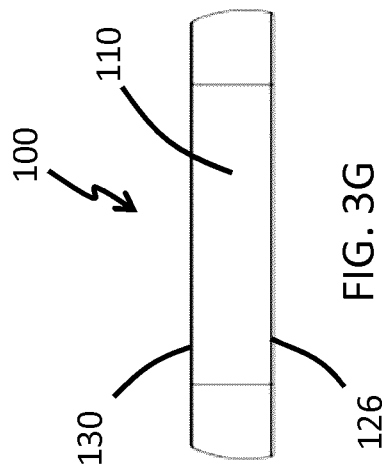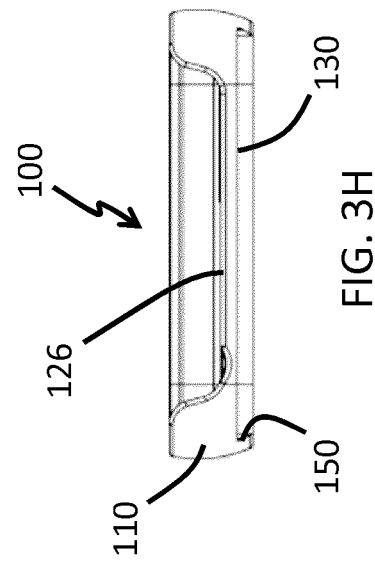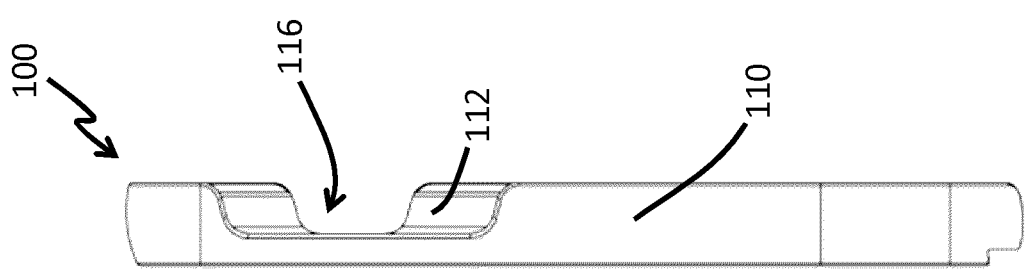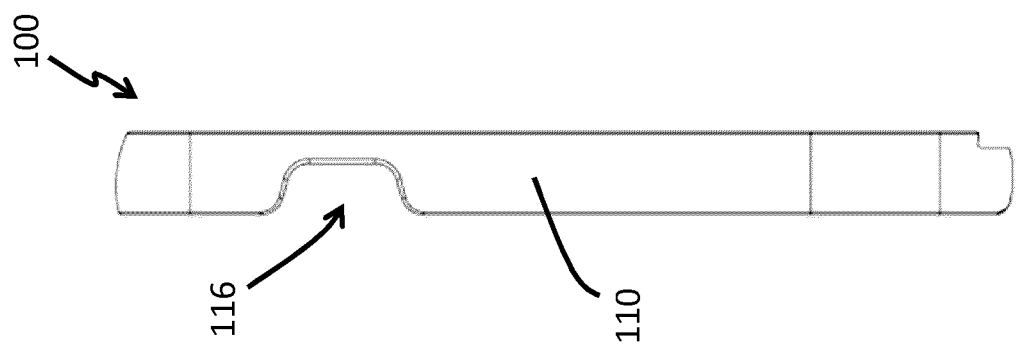

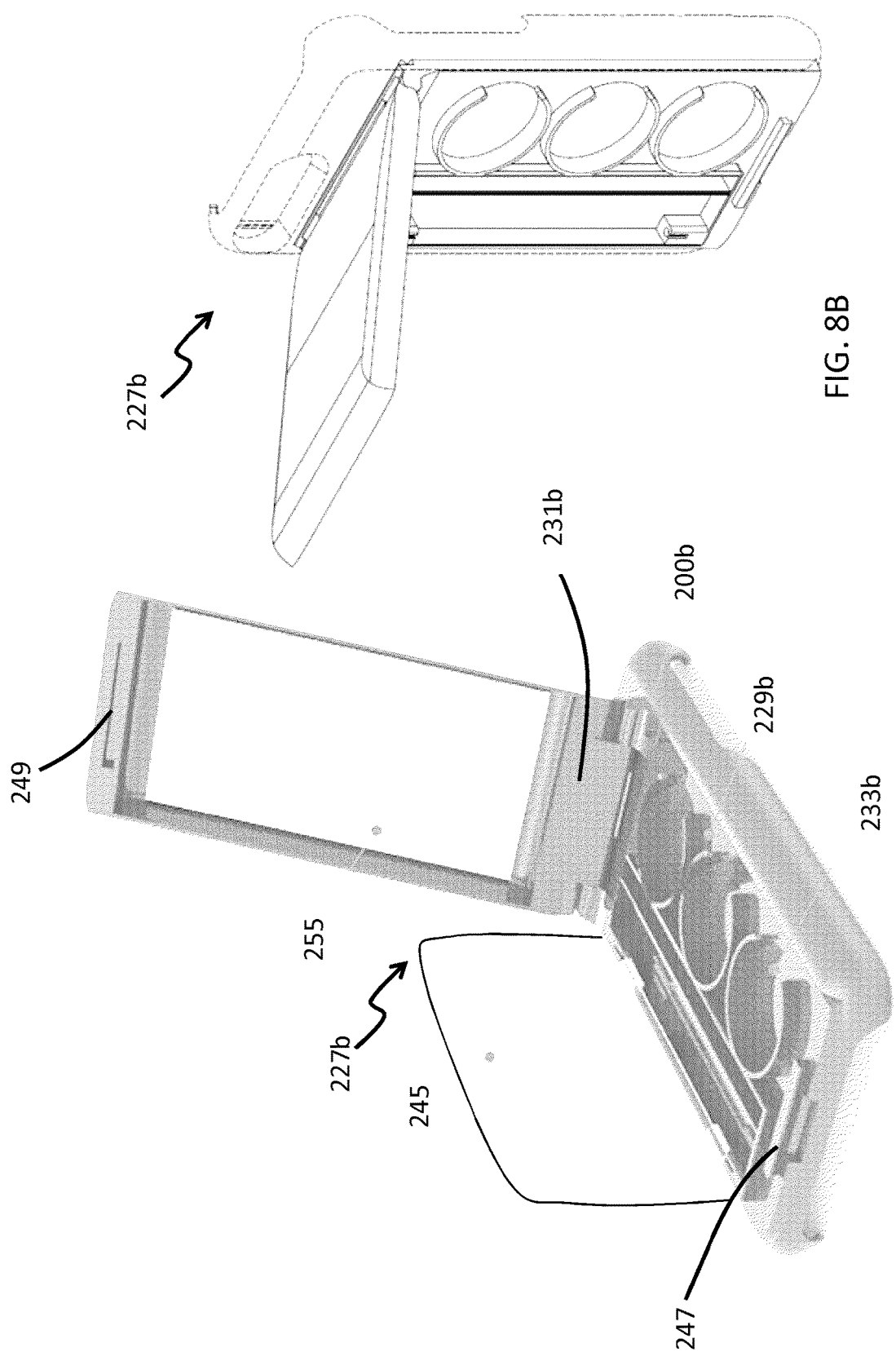

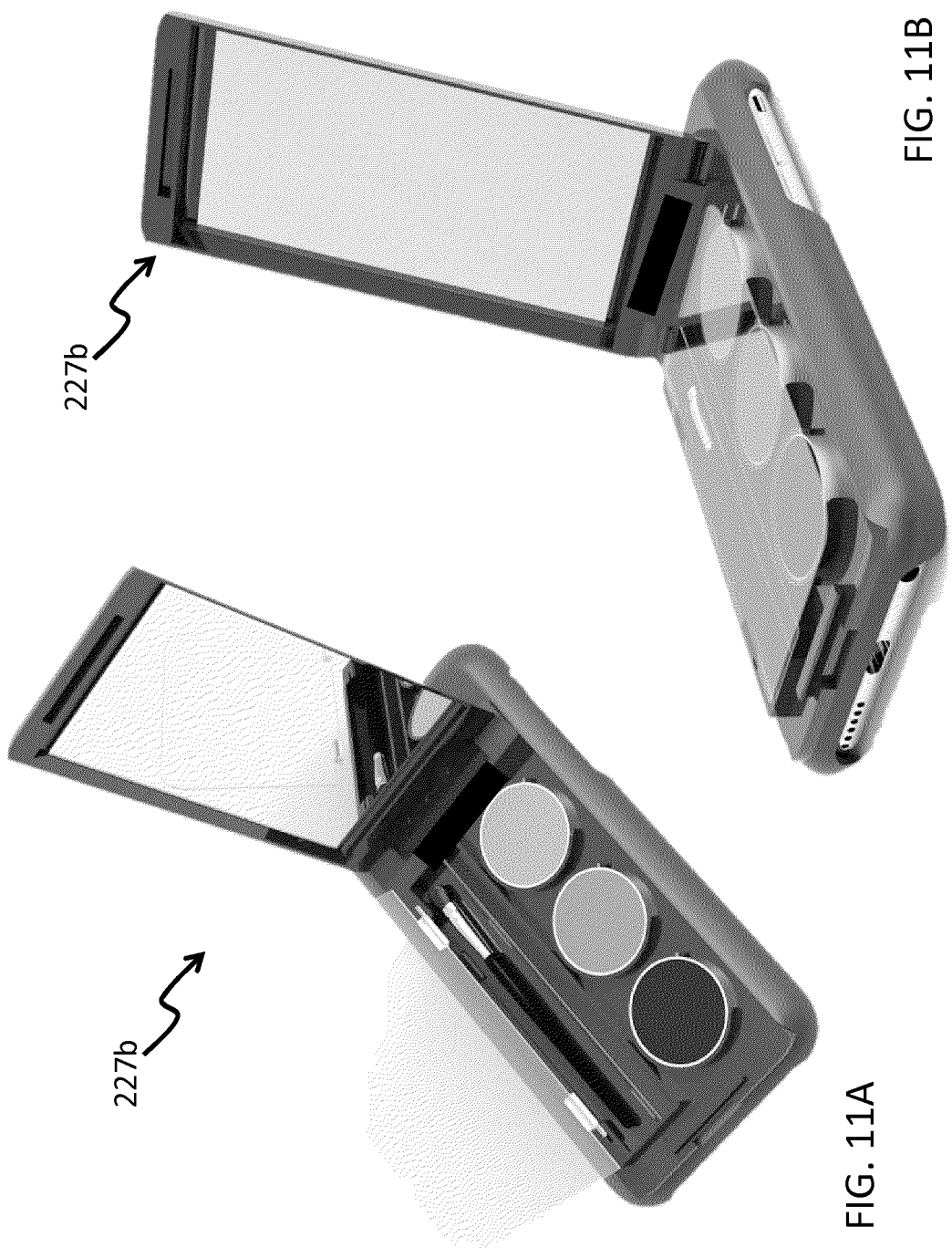

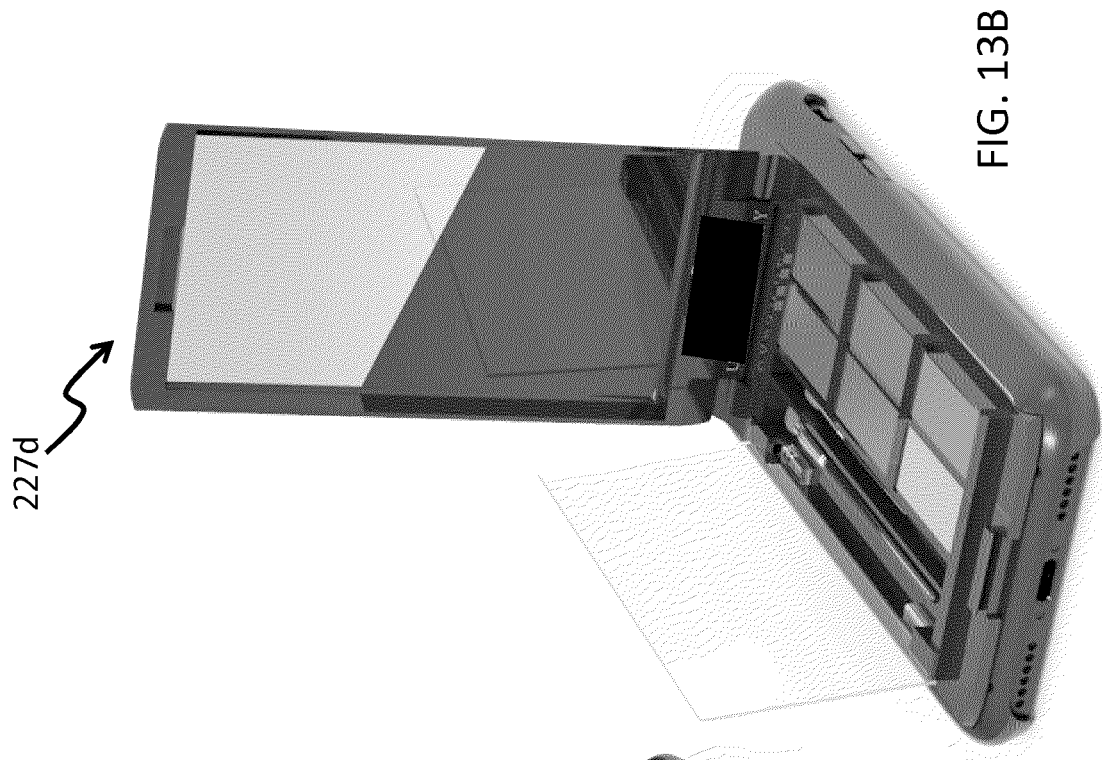
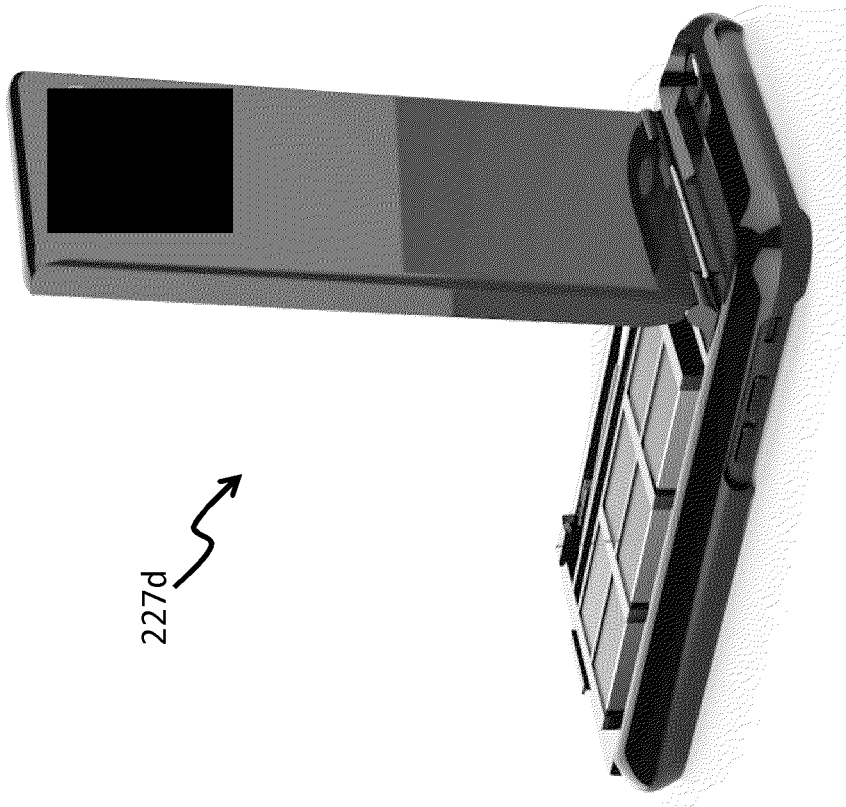

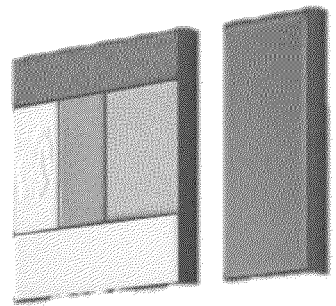
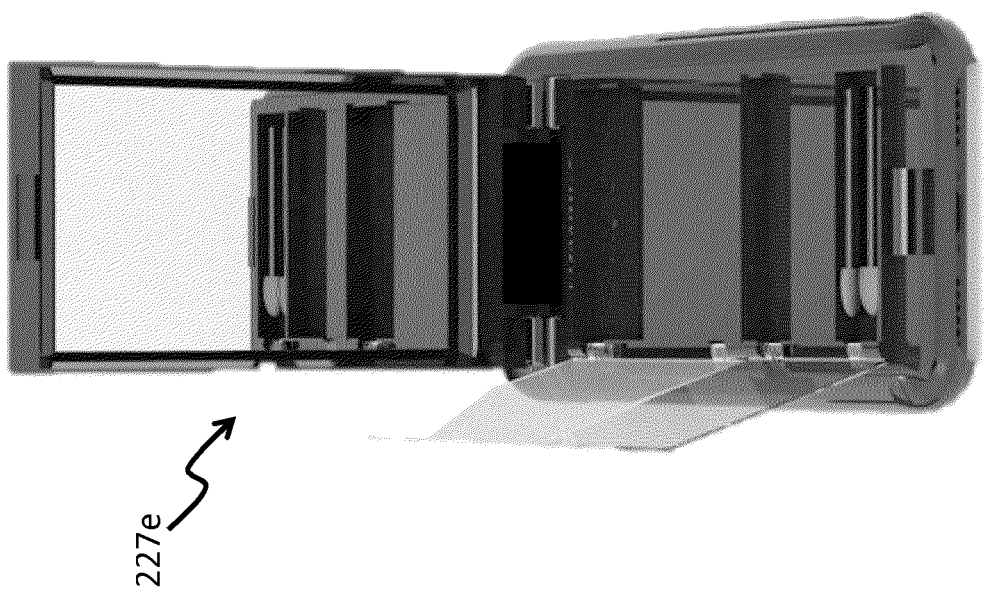
FIG. 14D
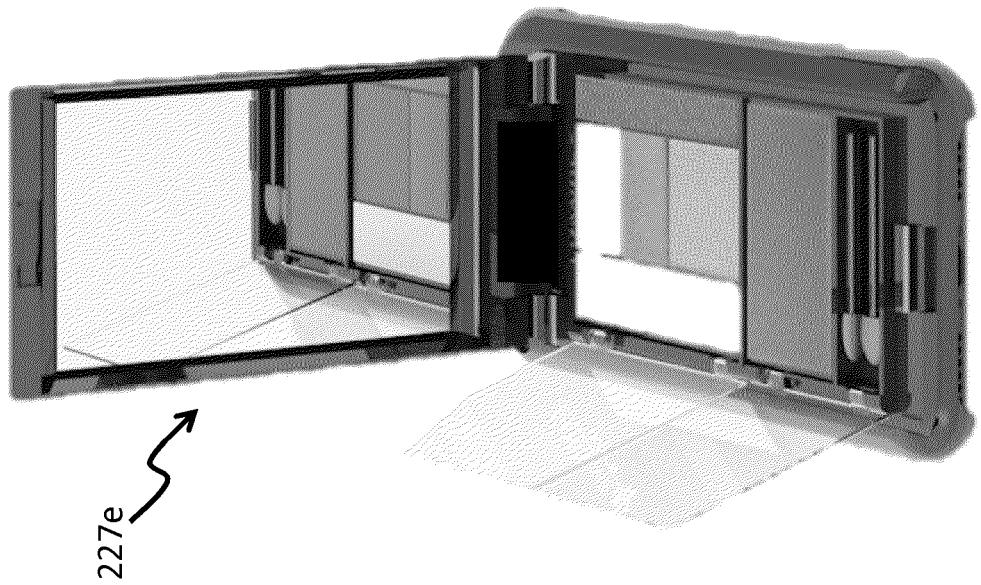
FIG. 14C

PHONE CASE WITH INTERCHANGEABLE COSMETIC ACCESSORY ATTACHMENT SYSTEM

CROSS-REFERENCE TO RELATED APPLICATIONS

This application is a continuation of U.S. patent application Ser. No. 15/426,585 filed Feb. 7, 2017, and issued as U.S. Pat. No. 10,404,310, which claims priority to U.S. Provisional Patent Application No. 62/384,030 filed Sep. 6, 2016, each of which is incorporated in its entirety by reference, herein. Any and all priority claims identified in the Application Data Sheet, or any correction thereto, are hereby incorporated by reference under 37 CFR 1.57.

BACKGROUND

Field

Embodiments of the present invention are directed to phone cases and removable attachments and/or accessories that can be coupled to the phone case. In one embodiment, the accessory attachments includes cosmetic make-up panels, lids, covers, latches, buttons, mirrors, and modular storage systems for make-up application and/or removal that can be adjusted to the requirements of the human user.

Background

Phones, including but not limited to cell/cellular, mobile, wireless, and/or smart phones, have become useful repositories for information and communication by many users. Although phones are useful, phones can be somewhat problematic to transport. Storing a phone in a purse or pocket can result in the phone being scratched by keys, coins, or other objects stored with the phone. Phone cases have been developed to provide a storage compartment attached to the rear of the phone that enables a user to transport a small quantity of essential items with the phone. However, a need exists for a phone cases that allow a user to transport a wider variety of items.

SUMMARY

Embodiments of the present invention relate to a phone case that can be customized depending on the needs of the user. In certain aspects of the present disclosure, the phone case has a sidewall that retains the phone and protects the phone from damage. A portion of the sidewall is designed to provide a railing system that allows a user to reversibly join attachments to the phone case. In certain aspects of the present disclosure, the attachments allow a user to change the cosmetic features of the phone. In certain aspects of the present disclosure, the attachments are reversible cards or accessories that allow a user to remove the attachment from the case railing system, flip the card to display a different design, and reinsert the attachment onto the railing system of the phone case. Optionally, the attachment is a mirror. In at least one embodiment, the attachment has a mirror on either side of the attachment, with each mirror having a different magnification.

In some embodiments, the accessories are cosmetics, such as make-up, blush, foundation, primer, lip coloring, lip gloss, lip stick, mascara, eye liner, eye shadow, lotion, skin conditioner, acne medication (e.g., benzoyl peroxide, salicylic acid, alpha hydroxy acid, sulfur, etc.), brush, swab, pencil, pen, highlighting, glitter, ink, implement, pad, wipe, and/or any other make-up related accessory. In various embodiments, an interchangeable set of accessories are provided in a group. In some embodiments, the group is an color theme, a work pack, an evening pack, an adventure pack, a glamour pack, a fun pack, a costume pack.

In various embodiments, a phone case includes a housing configured for attachment to a phone, an interface configured for interchangeable attachment between the housing and an interchangeable cosmetic make-up accessory, and the interchangeable cosmetic make-up accessory. In various embodiments, the interchangeable cosmetic make-up accessory comprises one or more of the group consisting of: blush, foundation, primer, lip coloring, lip gloss, lip stick, mascara, eye liner, and eye shadow. In various embodiments, the interchangeable cosmetic make-up accessory comprises one or more of the group consisting of: lotion, skin conditioner, and acne medication. In various embodiments, the interchangeable cosmetic make-up accessory comprises one or more of the group consisting of: a brush, a swab, a pad, and a wipe. In various embodiments, the interchangeable cosmetic make-up accessory comprises one or more of the group consisting of: a make-up pencil, a make-up pen, a highlighting instrument, and glitter. In an embodiment, the interface comprises a releasable locking mechanism for locking and releasing the interchangeable cosmetic make-up accessory from the housing. In various embodiments, the locking mechanism is any one of the group consisting of a button, a slide, a toggle, a latch, a rail, and a snap fit.

In various embodiments, the interface comprises a first rail and a second rail parallel to the first rail, wherein the interchangeable cosmetic make-up accessory comprises a flange, wherein the flange is configured to engage the first and second rail and removably couple to the housing.

In an embodiment, the housing includes a first planar element comprising a front face and a rear face, the front face of the first planar element comprising a pair of side slots, the rear face of the first planar element comprising a central slot; and a first sidewall disposed along a lateral edge of the first planar element, the first sidewall being substantially perpendicular to the first planar element, the first sidewall comprising a front portion that extends beyond the front face of the first planar element, the first sidewall comprising a rear portion that extends beyond the rear face of the first planar element, the front portion of the first sidewall defining a first groove configured to retain a lateral edge of a phone, the rear portion of the first sidewall defining a first rail; and a bottom portion comprising: a second planar element comprising a front face and a rear face, the second planar element comprising a top edge interposed between two side edges, the second planar element comprising a pair of side tabs extending from the top edge, the second planar element comprising a central tab extending from the top edge, the central tab being interposed between the two side tabs, the side tabs being configured to engage the side slots, the central tab being configured to engage the central slot; and a second sidewall disposed along the side edges of the second planar element, the second sidewall being substantially perpendicular to the second planar element, the second sidewall comprising a front portion that extends beyond the second front face of the second planar element, the second sidewall comprising a rear portion that extends beyond the rear face of the second planar element, the front portion of the second sidewall defining a second groove configured to retain a lateral edge of a phone, the rear portion of the second sidewall defining a second rail, wherein the first rail is configured to align with the second rail when the side slots engage the side tabs, the interchangeable cosmetic make-up accessory comprising a flange, wherein the flange is configured to engage the first and second rail and couple the attachment to the phone case.

In various embodiments, a kit includes a case configured for attachment to a phone, wherein the case comprises an interface; and an interchangeable make-up accessory configured to reversibly couple to the interface on the case. In various embodiments, the interchangeable cosmetic make-up accessory comprises one or more of the group consisting of: blush, foundation, primer, lip coloring, lip gloss, lip stick, mascara, eye liner, eye shadow, lotion, skin conditioner, and acne medication. In various embodiments, the interchangeable cosmetic make-up accessory comprises one or more of the group consisting of: a brush, a swab, a pad, a wipe, a make-up pencil, a make-up pen, a highlighting instrument, and glitter. In various embodiments, the interface comprises a releasable locking mechanism for locking and releasing the interchangeable cosmetic make-up accessory from the housing, wherein the locking mechanism is any one of the group consisting of a button, a slide, a toggle, a latch, a rail, and a snap fit. In various embodiments, the interface comprises a first rail and a second rail parallel to the first rail, wherein the interchangeable make-up accessory comprises a flange, wherein the flange is configured to engage the first and second rail and removably couple to the case.

In various embodiments, a cosmetic make-up container includes a cosmetic container housing comprising a phone interface, and at least one cosmetic configured for application to a human, wherein the phone interface is configured for interchangeable, removable attachment to a phone case. In various embodiments, the cosmetic comprises one or more of the group consisting of: blush, foundation, primer, lip coloring, lip gloss, lip stick, mascara, eye liner, eye shadow, lotion, skin conditioner, and acne medication. In various embodiments, the cosmetic make-up container includes a cosmetic accessory comprising one or more of the group consisting of: a brush, a swab, a pad, a wipe, a make-up pencil, a make-up pen, a highlighting instrument, and glitter. In various embodiments, the phone interface is configured to operate with a releasable locking mechanism for locking and releasing the interchangeable cosmetic make-up accessory from the housing, wherein the locking mechanism is any one of the group consisting of a button, a slide, a toggle, a latch, a rail, and a snap fit. In various embodiments, the phone interface comprises a comprises a flange configured to engage with a first rail and a second rail parallel to the first rail on the phone case.

BRIEF DESCRIPTION OF THE DRAWINGS

Various embodiments are depicted in the accompanying drawings for illustrative purposes, and should in no way be interpreted as limiting the scope of the embodiments. Furthermore, various features of different disclosed embodiments can be combined to form additional embodiments, which are part of this disclosure.

FIG. 3E is a left side view of the assembled phone case in FIG. 3A.

FIG. 3F is a right side view of the assembled phone case in FIG. 3A.

FIG. 3G is a top end view of the phone case in FIG. 3A.

FIG. 3H shows a bottom end view of the phone case in FIG. 3A.

FIGS. 8A and 8B are a top perspective view and a side perspective view of an embodiment of a cosmetic compact attachment attached to a phone case.

FIGS. 11A and 11B are a top perspective view of an embodiment of an interchangeable cosmetic accessory with circular containers attached to a phone case with a transparent shield in an open and a closed configuration.

FIGS. 13A and 13B are a rear perspective view and top perspective view of an embodiment of an interchangeable cosmetic accessory with a plurality of rectangular containers attached to a phone case with a transparent shield in an open configuration.

FIGS. 14A, 14B, 14C and 14D are a front perspective views of an embodiment of an interchangeable cosmetic accessory with attached to a phone case with an interchangeable, replaceable container shown in and out of the accessory.

DETAILED DESCRIPTION

Certain aspects of the present disclosure are generally directed to phone attachments that allow a user to customize the phone according to the needs of the user. Each and every feature described herein, and each and every combination of two or more of such features, is included within the scope of the present disclosure provided that the features included in such a combination are not mutually inconsistent.

A person may need to carry different items based on the activity the person is doing. For example, a short trip to a store may require a person to carry only a phone and make-up. What is needed is a phone storage case that can be adjusted with interchangeable cosmetics depending on the make-up needs of the user.

The present disclosure is directed to a modular attachment system with an interface for attaching make-up to a phone case. In various embodiments, one aspect of the device is to provide a phone case that protects the phone from damage and establishes a an interface (such as a railing system, slide, latch, lock, pivot, snap fit, etc.) that allows various attachments to be reversibly and removably coupled to the phone case. The attachments may be configured to change the cosmetic appearance of the phone. Additionally or alternatively, the attachments may be configured to provide a storage area at the back surface of the phone for make-up and make-up related accessories. The attachments can enable adjustable storage capacity by providing a variety of attachments that use a common means for coupling to the phone case. The attachments can be configured to be storage compartments having different internal volumes, different height profiles, or different internal configurations. Additionally or alternatively, the attachments can be different accessories for the phone.

Figure 1:
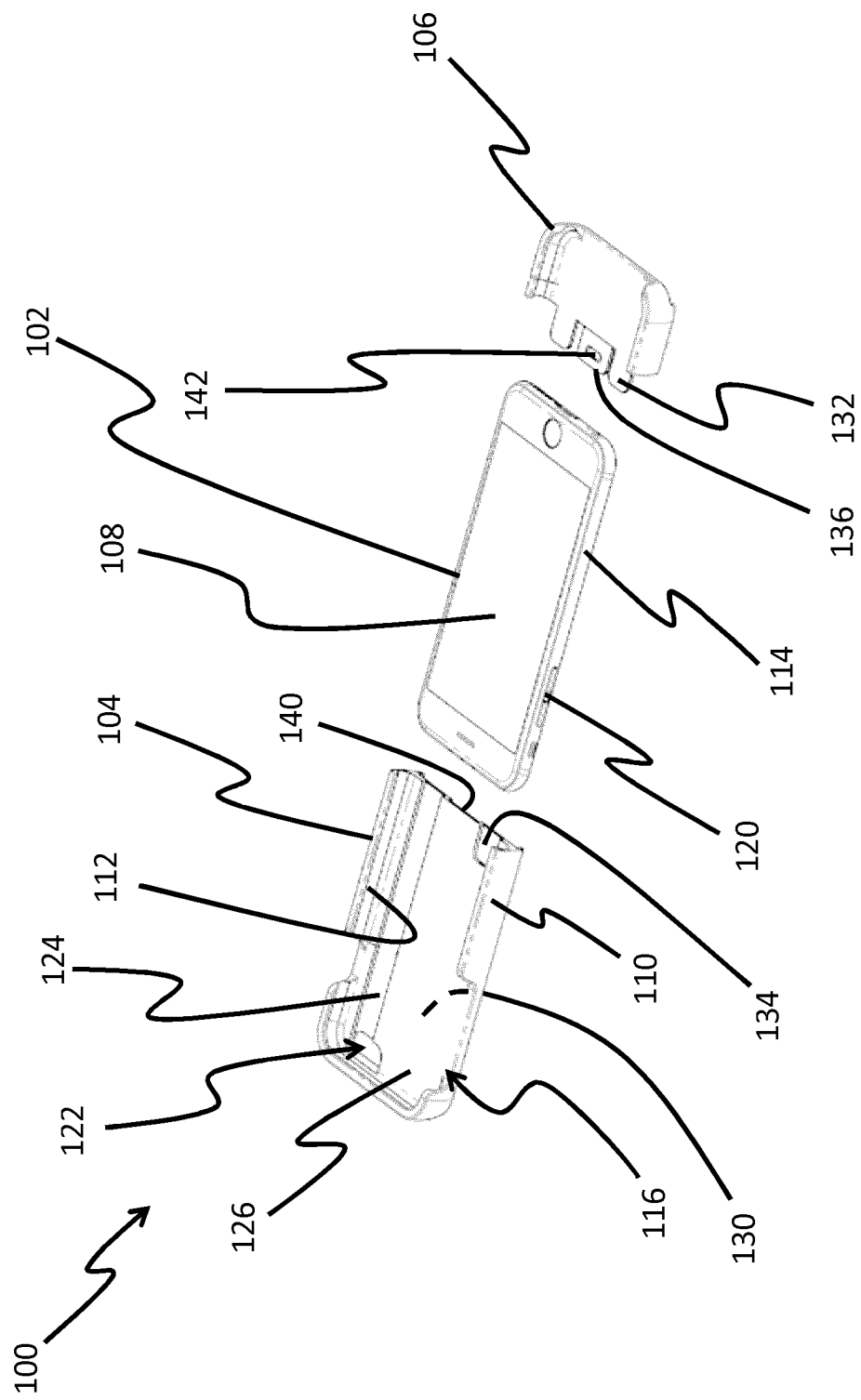
FIG. 1 illustrates an exploded view of an embodiment of a phone case showing how the phone case is assembled onto the phone.

FIG. 1 depicts a phone case 100 for coupling attachments to a phone 102. In the illustrated embodiment, the phone case 100 includes a housing with a top portion 104 and a bottom portion 106. The terms "top" and "bottom" used herein are to be interpreted broadly and may be interchangeable. For the purposes of the present disclosure, the term "top" refers to the portion of the phone case that encloses the speaker portion of the phone, while the term "bottom" refers to the portion of the phone case that encloses the microphone portion of the phone. However, depending on the configuration of the phone, the terms "top" and "bottom" may be interchanged, and substituted for a first and second portion. The term "front" refers to a surface that faces in the same direction as the screen 108 of the phone 102 when the phone 102 is seated in the phone case 100. The term "rear" refers to a surface that faces in the direction that is opposite of the "front" direction.

The top portion 104 and the bottom portion 106 of the housing can have a sidewall 110 that retains the phone 102 within the phone case 100. The sidewall 100 may define a groove 112 configured to receive and retain a lateral edge 114 of the phone 102. The sidewall 110 may include at least one recess 116 that allows a user to access a control button 120 on the lateral edge 114 of the phone 102 when the phone 102 is seated within the phone case 100. The sidewall 110 can wrap around at least a portion of the top of the top portion 104 and the bottom of the bottom portion 106 to prevent the phone 102 from sliding out of the phone case 100. The portion of the sidewall 110 that wraps around the bottom of the bottom portion 106 may contain a recess 116 that allows a user to access a charging jack or some other portion of the phone 102. The portion of the side wall 110 that wraps around the top of the top portion 104 can contain a recess 116 that allows a user to access a portion of the phone 102.

The top portion 104 can include a window 122. The window 122 can be configured to align with a camera lens 166 (shown in FIG. 4) located on the rear face of the phone 102 when the phone 102 is seated within the phone case 100. The window 122 can be a through-hole that communicates between a front face 126 and a rear face 130 of the top portion 104. The window 122 may include a transparent covering (not shown) that is interposed between the front and rear faces 126, 130 of the top portion 104. The transparent covering may protect the camera lens of the phone from damage while allowing the camera lens to visualize through the window 122. The top portion 104 may include a channel 124 that runs along a front face 126 of the top portion 104 of the phone case 100. The channel 124 can terminate at the window 122. The channel 124 can be configured so that a camera lens that protrudes from a rear face of the phone 102 can travel within the channel 124 as the phone 102 is seated into the top portion 104 of the phone case 100. In this way, the channel 124 can be configured so that a camera lens protruding from the rear face of the phone 102 does not come into contact with the front face 126 of the top portion 104 of the phone case 100 when the phone 102 is seated into the phone case 100, thereby preventing the camera lens from being scratched by the top portion 104 of the phone case 100 as the phone 102 is seated into the top portion 104 of the case 100.

The top portion 104 and the bottom portion 106 of the phone case 100 can be configured to snap together. The bottom portion 106 can have a side tab 132 that engages a side slot 134 on the top portion 104. Additionally or alternatively, the bottom portion 106 can have a central tab 136 that engages a central slot 140 on the top portion 104. Additionally or alternatively, the side or central tabs 132,136 can be located on the top portion 104 with the side or central slots 134,140 being located on the lower portion 106. The side or central tabs 132, 136 can include an engagement member 142 that is configured to enhance the interaction between the side or central tab 132, 136 with the side or central slot 134, 140. The engagement member 142 can be configured to reversibly couple to a receiving member 152 (shown in FIG. 3B).

The phone 102 can be seated into the phone case 100 by sliding a lateral edge 114 of the phone 102 into the groove 112 of the top portion 104 and sliding the phone 102 up to the top edge of the top portion 104. The lateral edge 114 of the phone 102 that remains outside of the groove 112 of the top portion 104 can then be inserted into the groove 112 of the bottom portion 106. The bottom portion 106 is then push toward the top portion 104 until the side and central tabs 132, 136 engage the side and central slots 134,140, thereby snapping together the top and bottom portions 104,106. Alternatively, the phone 102 can be inserted first into the bottom portion 106 and then inserted into the top portion 104.

Figure 2:
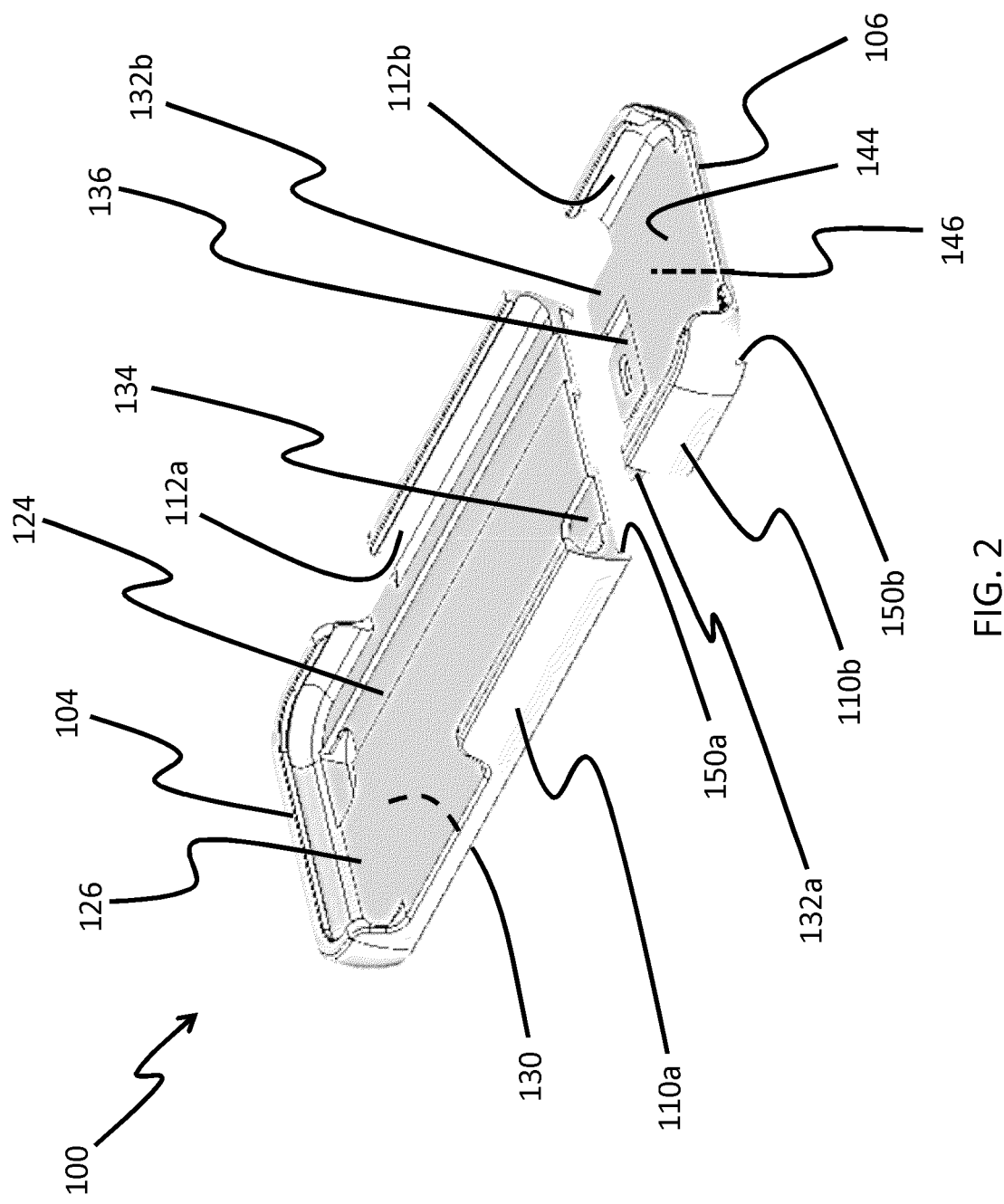
FIG. 2 illustrates an exploded view of an embodiment of a phone case.

FIG. 2 depicts in an embodiment of a top portion 104 and bottom portion 106 of the phone case 100. The bottom portion 106 can include a central tab 136 interposed between two side tabs 132a,b. The front face of the side tabs 132a,b can be coplanar with the front face 144 of the bottom portion 106. The front face of the central tab 136 can be recessed (i.e., rearward) from the front face 144 of the bottom portion 106.

The rear face of the side tabs 132a,b can be configured to slide over the front face of the side slot 134. The front face of the side slot 134 may be canted or level. The rear face of the side tab 132a,b may be canted or level. A rear face of a side tab 132b can be configured to slide over the front face of the channel 124. The side tab 132a,b may be configured to bend as the side tab 132a,b slides into the side slot 134. Additionally or alternatively, the side slot 134 can be located on the rear face of the top portion 104.

The rear face of the side tabs 132a,b can be offset relative to the front face of the central tab 136 so that the side tabs 132a,b and the central tab 136 generate a bending moment when the side tabs 132a,b and the central tab 136 engage the side and central slots 134,136 on the top portion. The rear face of the side tabs 132a,b can be located rearward of the front face of the central tab 136. The rear face of the side tabs 132a,b can be located frontward of the front face of the central tab 136.

The sidewalls 110a,b of the top and bottom portions 104,106 can extend rearward of the rear faces 130,146 of the top and bottom portions 104,106, as shown in FIG. 2. The rearward extending portion of the sidewall 110a of the top portion 104 can define a first rail 150a. The rearward extending portion of the sidewall 110b of the bottom portion 106 can define a second rail 150b. In one embodiment, the first rail 150a and second rail 150b are parallel to each other. The first and second rails 150a,b can include a lip of material that extends from the sidewall 110 and runs parallel to the rear faces 130,146 of the top and bottom portions 104,106. The first and second rails 150a,b can be brought into alignment with one another when the side and central tabs 132,136 engage the side and central slots 134,140. Additionally or alternatively, the first and second rails 150a,b can be brought into alignment when the lateral edge 114 of the phone 102 engages the groove 112a,b of the top and bottom portion 104,106.

Figure 3A:
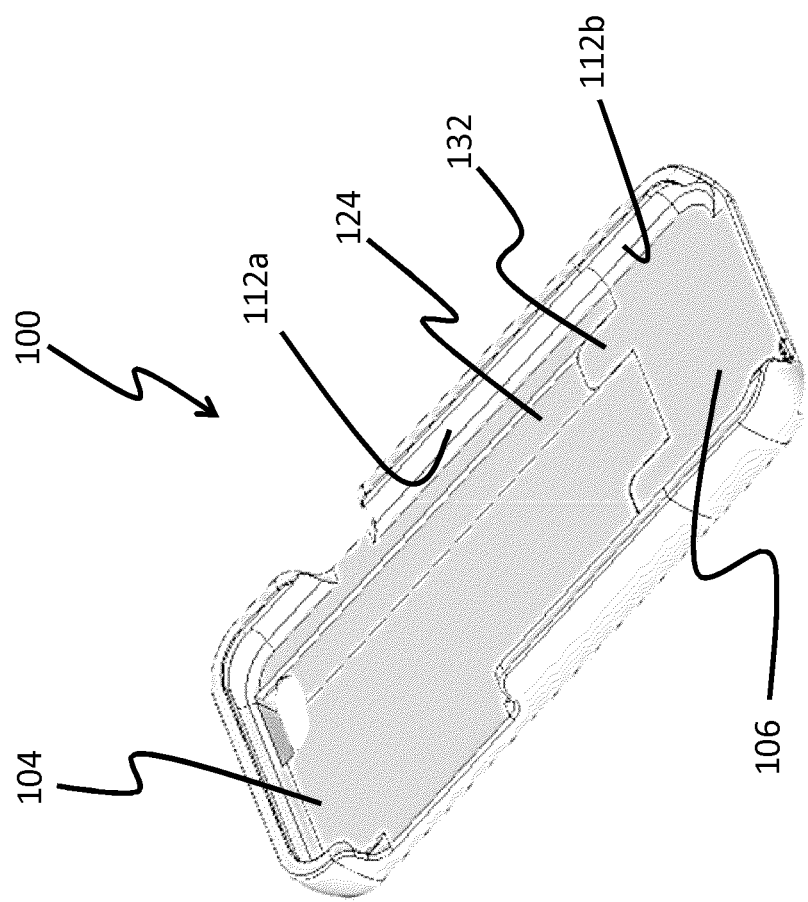
FIG. 3A is a front perspective view of the assembled phone case in FIG. 2.

FIG. 3A depicts a front view of a phone case 100 with the top and bottom portions 104,106 coupled together. The side tab 132 of the bottom portion 106 can engage the bottom part of the channel 124 of the top portion 104. When the top portion 104 is coupled to the bottom portion 106, a first groove 112a of the top portion 104 can be brought into alignment with a second groove 112b of the bottom portion 106.

Figure 3B:
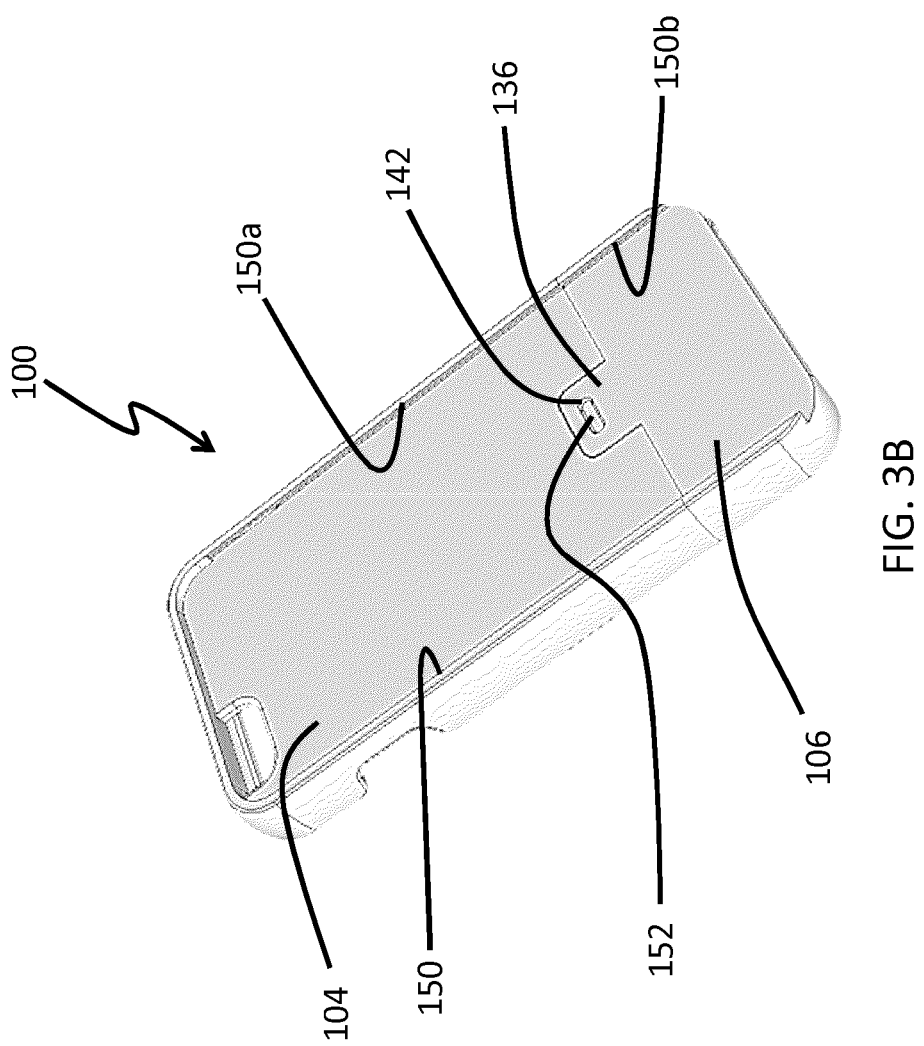
FIG. 3B is a rear perspective view of the phone case in FIG. 3A.

FIG. 3B depicts a rear view of the phone case shown in FIG. 3A. The engagement member 142 of the central tab 136 can engage a receiving member 152 on the top portion 104. The engagement member 142 can be a through-hole and the receiving member 152 can be a protrusion configured to pass into at least a portion of the through-hole.

When the top portion 104 is couple to the bottom portion 106, a first rail 150a of the top portion 104 can be brought into alignment with a second rail 150b of the bottom portion 106. The phone case 100 can have a rail 150 on either side of the phone case 100. The rail 150 can run the entire length of the phone case 100. The rail 150 can be continuous and wrap around the top of the top portion 104. The rail 150 can be discontinuous and run intermittently along the length of the phone case 100. The rail 150 on either side of the phone case 100 may mirror the rail 150 on the other side of the phone case 100. The rail 150 on either side of the phone case 100 may be dissimilar from the rail 150 on the other side of the phone case 100. The rail 150 on one side of the phone case 100 may be wider (i.e., extend further away from the sidewall 110) than the rail 150 on the other side of the phone case 100.

Figure 3D:
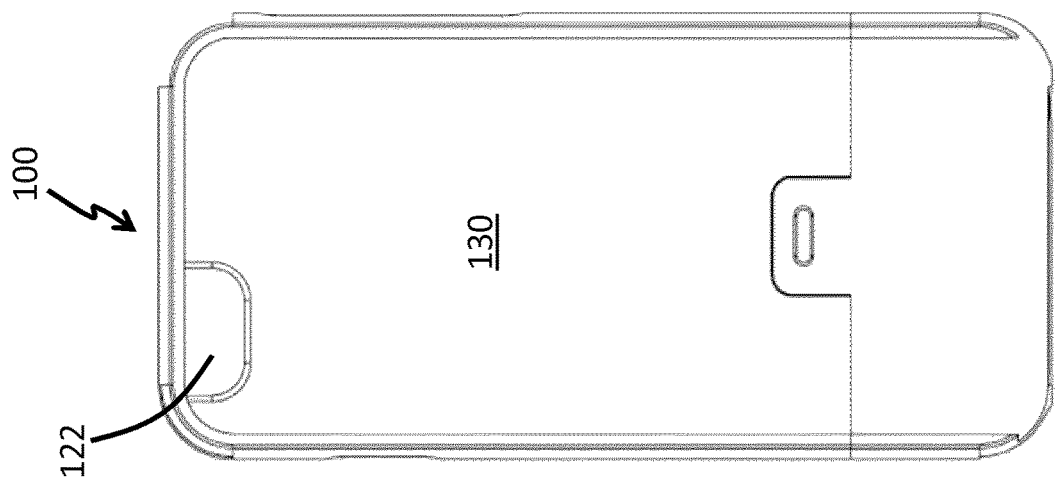
FIG. 3D is a rear view of the assembled phone case in FIG. 3A.
Figure 3C:
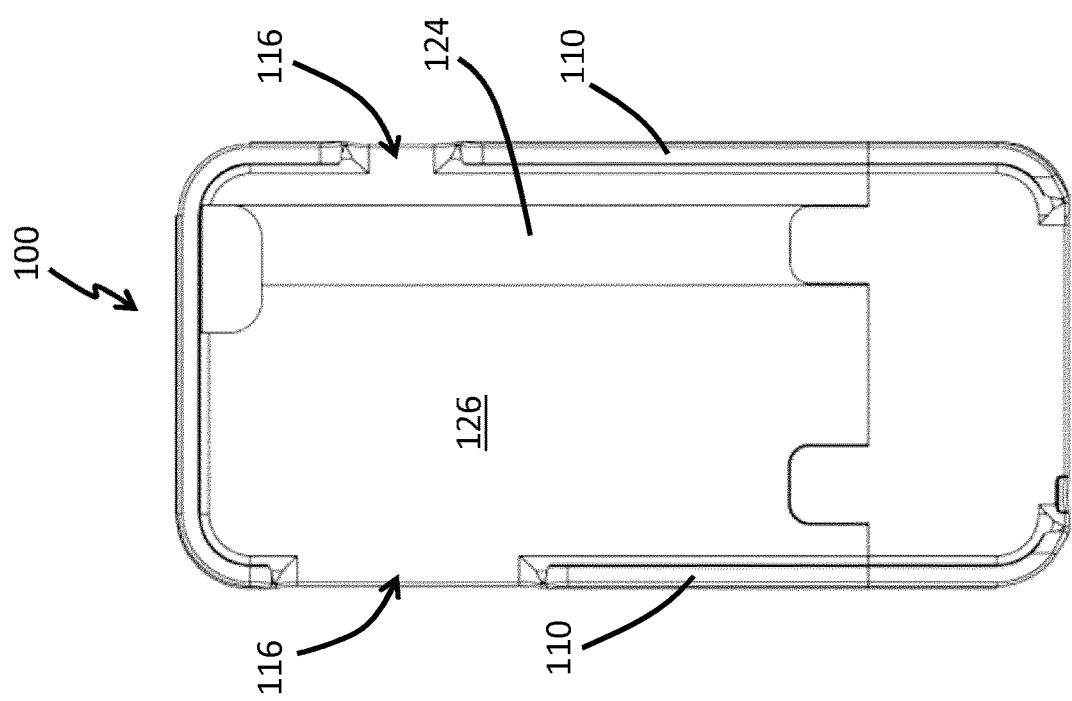
FIG. 3C is a front view of the assembled phone case in FIG. 3A.

FIG. 3C shows a front view of the phone case 100 shown in FIG. 3A. As shown in FIG. 3C, the front face 126 of the phone case 100 has a groove 124 that runs parallel to the side wall 110 near the left-hand side of the phone case 100. The side wall 110 along the left-hand side of the phone case 100 has a recess 116 that aligns with a recess 116 in the side wall 110 along the right-hand side of the phone case 100. The recess 116 in the side wall 110 on the right-hand side of the phone case 100 is larger than the recess 116 in the side wall 110 on the left-hand side of the phone case 100. The recesses 116 are for illustrative purposes only and not meant to be limiting. The recesses 116 can be customized to accommodate the size and position of the control buttons that are on the lateral edge of the phone that will be seated into the phone case 100.

FIG. 3D shows a rear view of the phone case 100 shown in FIG. 3A. As shown in FIG. 3D, the phone case 100 can have a window 122 that provides an opening in the rear face 130 of the phone case 100. The window 122 is adapted to align with a camera on the phone that is seated in the phone case 100 so that the phone case 100 does not block the phone camera lens when the phone is seated in the phone case 100.

FIG. 3E shows a left side view of the phone case 100 shown in FIG. 3A. FIG. 3F shows a right side view of the phone case 100 shown in FIG. 3A. As shown in FIG. 3F, the groove 112 in the side wall 110 of the left edge of the phone case 100 is visible through the recess 116 in the side wall 110 on the right edge of the phone case 100.

FIG. 3G is an end view of the top of the phone case 100. FIG. 3H is an end view of the bottom of the phone case 100. As shown in FIG. 3H, the rail 150 is accessible through the bottom edge of the phone case 100. As described below, an attachment can be attached to the phone case 100 by sliding the attachment onto the rail 150. In the illustrated embodiment, the phone case 100 is adapted to allow the attachment to access the rail 150 at the bottom edge of the phone case 100.

Figure 4:
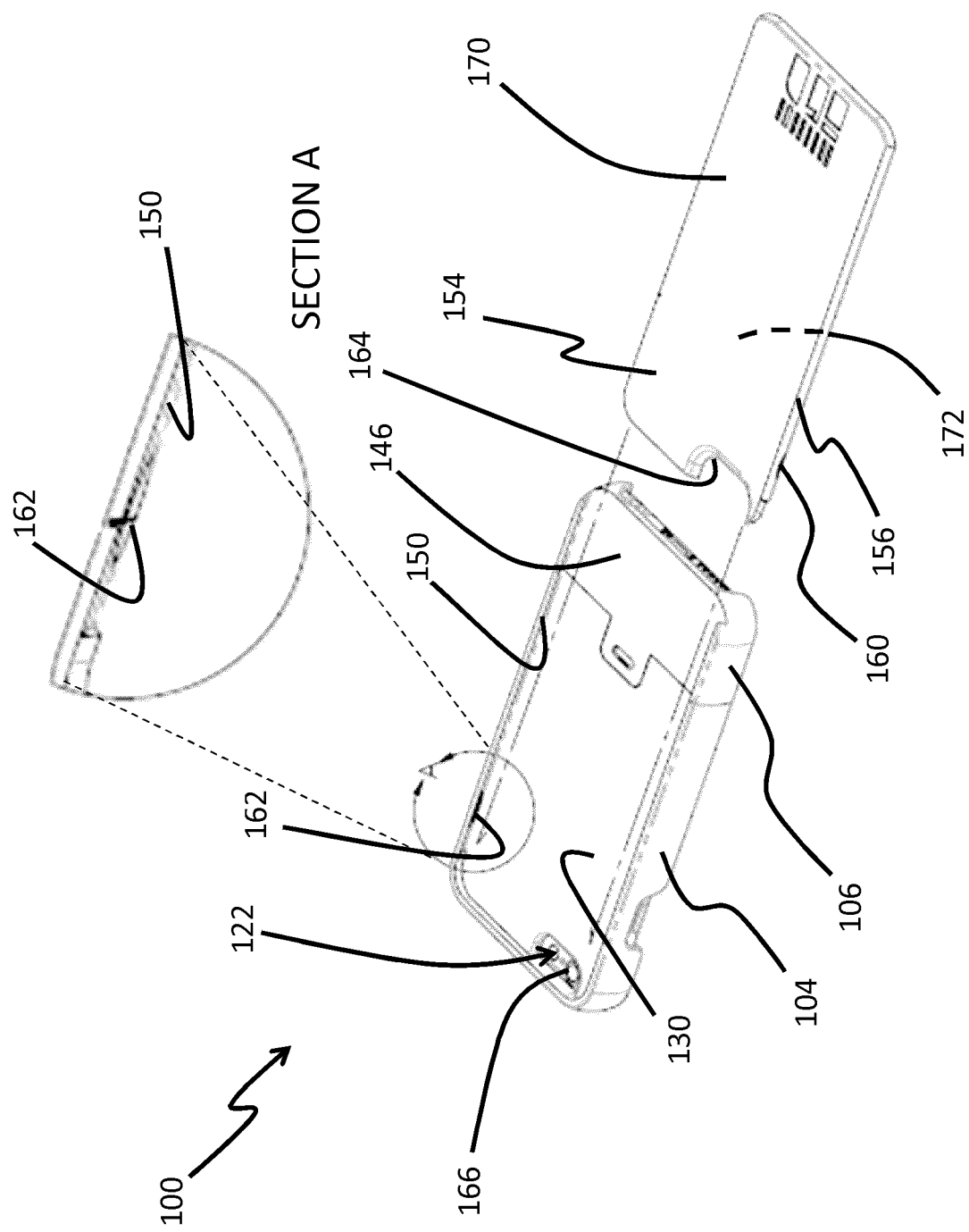
FIG. 4 is an exploded, back perspective view of an embodiment of a phone case and an attachment configured to couple to the phone case.

FIG. 4 depicts an attachment 154 configured to couple to the phone case 100. The attachment 154 can have a flange 156 configured to engage the rail 150. The flange 156 may slide between the rail 150 and the rear faces 130,146 of the top and bottom portions 104,106 of the phone case 100. Additionally or alternatively, the flange 156 can have a C-shaped groove that is configured to cup around the rail 150. The flange 156 along one edge of the attachment 154 can have a C-shaped groove with the flange 156 on the other edge of the attachment 154 being a lip without a C-shaped groove.

The attachment 154 can be coupled to the phone case 100 by inserting the top edge of the attachment 154 between the rail 150 and the rear face 146 of the bottom portion and sliding the attachment 154 toward the top portion 104 of the phone case 100. The attachment 154 can have a locking member 160 that engages with a retaining member 162 on the phone case 100. The attachment 154 can be coupled to the phone case 100 by sliding the attachment 154 toward the top edge of the top portion 104 until the locking member 160 engages the retaining member 162. The locking member 160 can be a protrusion and the retaining member 162 can be a détente. The attachment 154 can be reversibly coupled to the phone case 100 by configuring the locking member 160 to be a deformable protrusion that reversibly engages a retaining member 162 that is a détente configured to reversibly retain the protrusion.

The attachment 154 can include an indentation 164. The indentation 164 can be configured so that the attachment 154 does not cover the camera lens 166 of a phone 102 seated in the phone case 100 when the attachment 154 is coupled to the phone case 100. The attachment 154 may include a plurality of indentations 164 so that the attachment 154 may be coupled to the phone case 100 in different orientations. The attachment 154 may have an indentation 164 at the top edge and at the bottom edge of the attachment 154, allowing the attachment 154 to be inserted with the top edge of the attachment 154 toward the top edge of the phone case 100 or toward the bottom edge of the phone case 100. The attachment 154 may have an indentation on the left and right side of the top edge so that the attachment 154 can be inserted with the rear face 170 of the attachment 154 facing toward the phone case 100 or facing away from the phone case 100.

Figure 5:
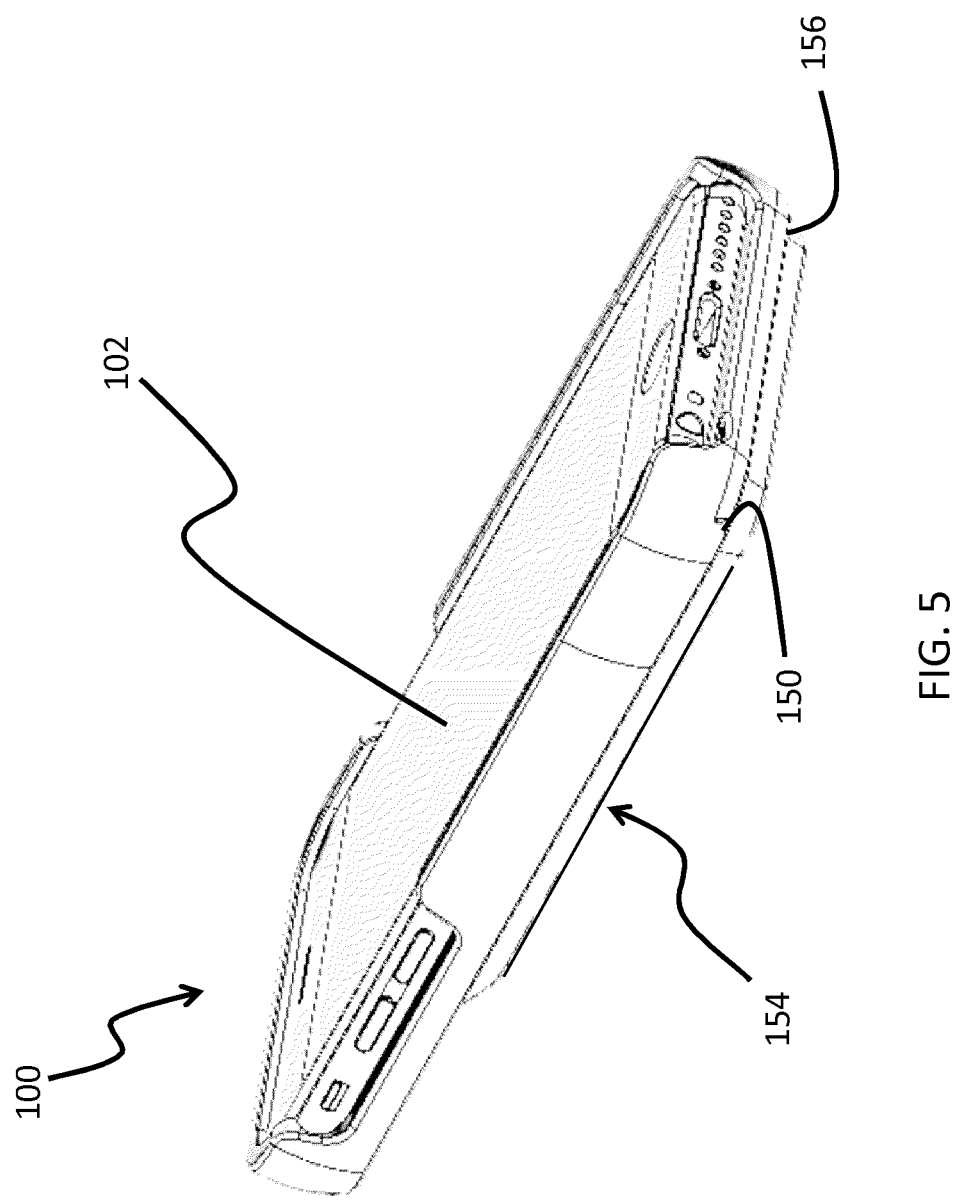
FIG. 5 is a perspective view of a phone seated into a phone case that has an attachment coupled to the phone case.

FIG. 5 depicts a phone 102 seated in the phone case 100 with an attachment 154 coupled to the phone case 100. As shown in the illustrated embodiment and discussed above, the attachment 154 has a flange 156 that can access the rail 150 at the bottom edge of the phone case 100, allowing the flange 156 to be slid along the rail 150 toward the top edge of the phone case 100 to attach the attachment 154 to the phone case 100.

Figure 6A:
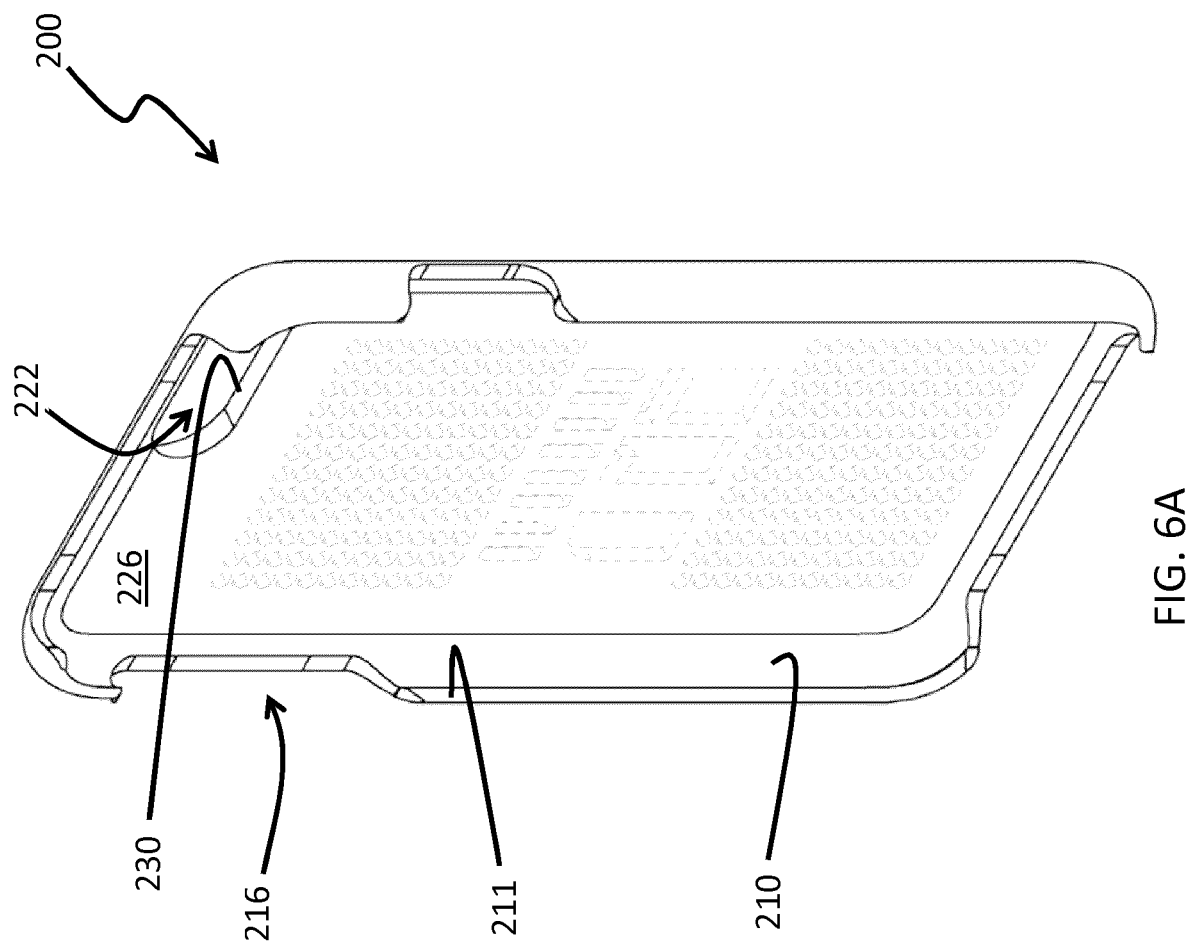
FIG. 6A is a front perspective view of an embodiment of a phone case.

FIG. 6A shows another embodiment of the phone case 200 that is similar to the phone case 100 except as described differently below. The features of the phone case 200 can be combined or included with the phone case 100 or any other embodiment discussed herein. The phone case 200 housing can have a unitary structure and need not include the detachable top and bottom portions 104, 106 that were described with regard to the embodiment of the phone case 100 shown in FIG. 1. With continued reference to FIG. 6A, the phone case 200 can have a side wall 210 that extends frontward from the front face 226 of the phone case 200. The side wall 210 can include recesses 216 that are configured to allow a user to access portions (e.g., control buttons) of the phone that is seated in the phone case 200. The side wall 200 can be disposed on at least a portion of the left, right, top, and bottom edges of the phone case 200 so that the side wall 200 holds a phone in the phone case 200 when the phone is seated in the phone case 200.

The side wall 200 can include or be made of a flexible material (e.g., plastic) that allows the side wall 200 to be deformed laterally away from an opposing portion of the side wall 200. In this way, a user can gently pry the side wall 200 apart to allow a user to seat a phone into, or unseat a phone from, the phone case 200. The side wall 200 can include a lip 211 that extends laterally inward from the side wall 200. In the illustrated embodiment, the lip 211 is disposed on the front-most portion of the side wall 200. However, the lip 211 can be disposed at a location on the side wall 200 other than the front-most portion of the side wall 200. The lip 211 can be adapted to help retain the phone within the phone case 200. The phone case 200 can include a window 222 that communicates between the front face 226 and rear face 230 of the phone case 200.

Figure 6B:
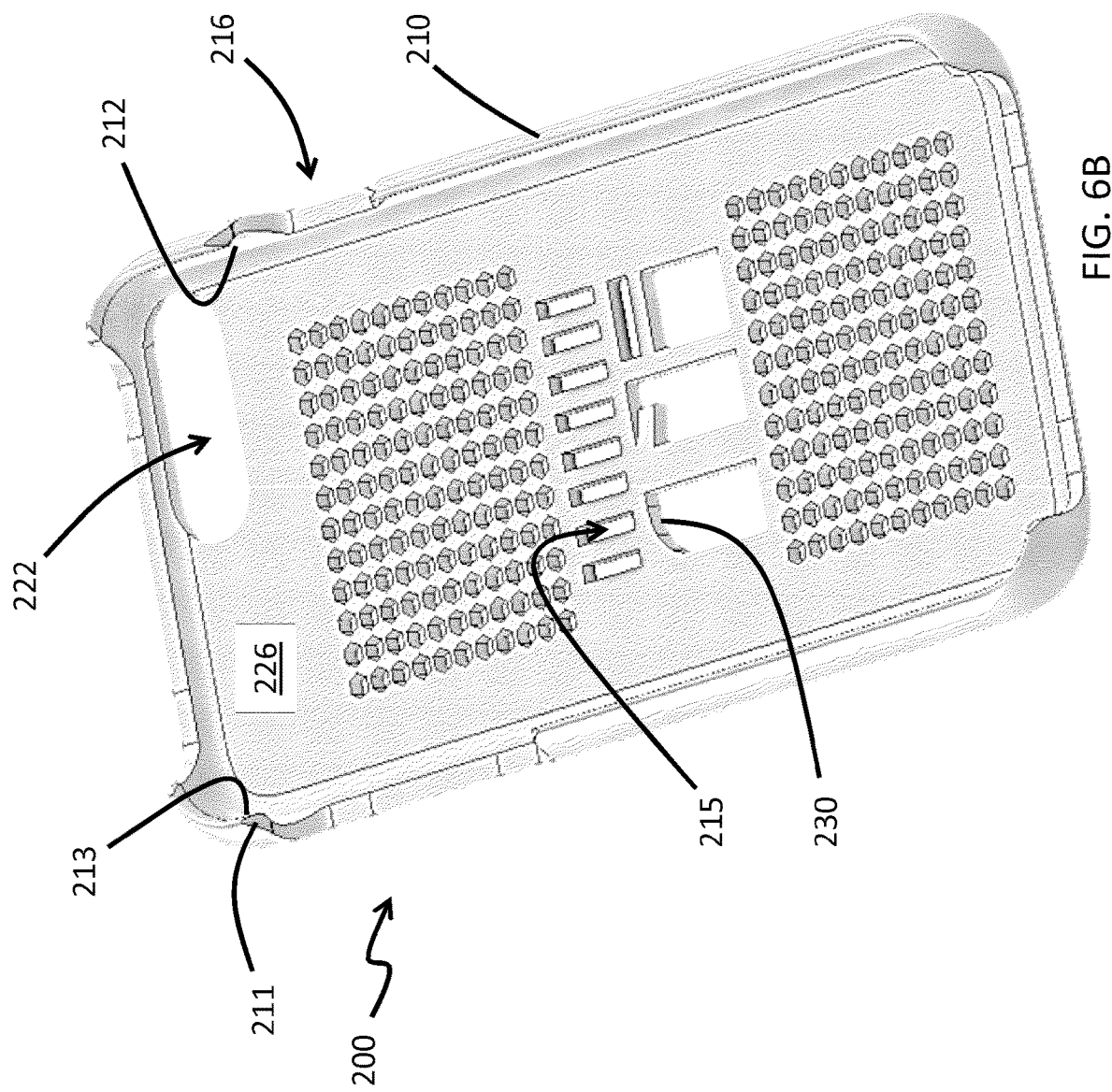
FIG. 6B is a front perspective view of the phone case of FIG. 6A.

Referring to FIG. 6B, the phone case 200 can include a groove 212 that is disposed on at least a portion of the inside surface of the side wall 210. The groove 212 can help seat a phone into the phone case 200. For example, a user can seat a phone into the phone case 200 by first inserting a first lateral edge of the phone into the groove 212. Because the lip 211 on the opposing side wall 210 protrudes medially inward, the lateral edge of the phone that is opposite of the edge that is inserted into the groove 212 will encounter the lip 211 and be blocked from reaching the front face 226 of the phone case 200. The lip 211 can include a cam surface 213 that is adapted to allow the phone to force the opposing side walls 210 laterally outward to allow the phone to pass by the lip 211 and reach the front face 226 of the phone case 200. In this way, a user can use a phone to deform the sidewalls 210 of the unitary phone case 200 to allow the phone to be snapped into place within the phone case 200.

With continued reference to FIG. 6B, the phone case 200 can include one or more openings 215 that pass through phone case 200 to communicate with the front and rear faces 226, 230 of the phone case 200. In the illustrated embodiment, some of the openings 215 are arranged as an array of circular openings 215 that are aligned in rows and columns. Some of the openings 215 are arranged as rectangular slots aligned in a row. Some of the openings 215 can be configured to display a logo or an image or a text character. In some embodiments, the openings 215 can provide a textured surface that enhances the grip characteristics (e.g., feel, friction) of the phone case 200. In some embodiments, the openings 215 enhance heat transfer from the phone when the phone is seated in the phone case 200. In some embodiments, the openings 215 can enhance the aesthetic appeal of the phone case 200.

Figure 6C:
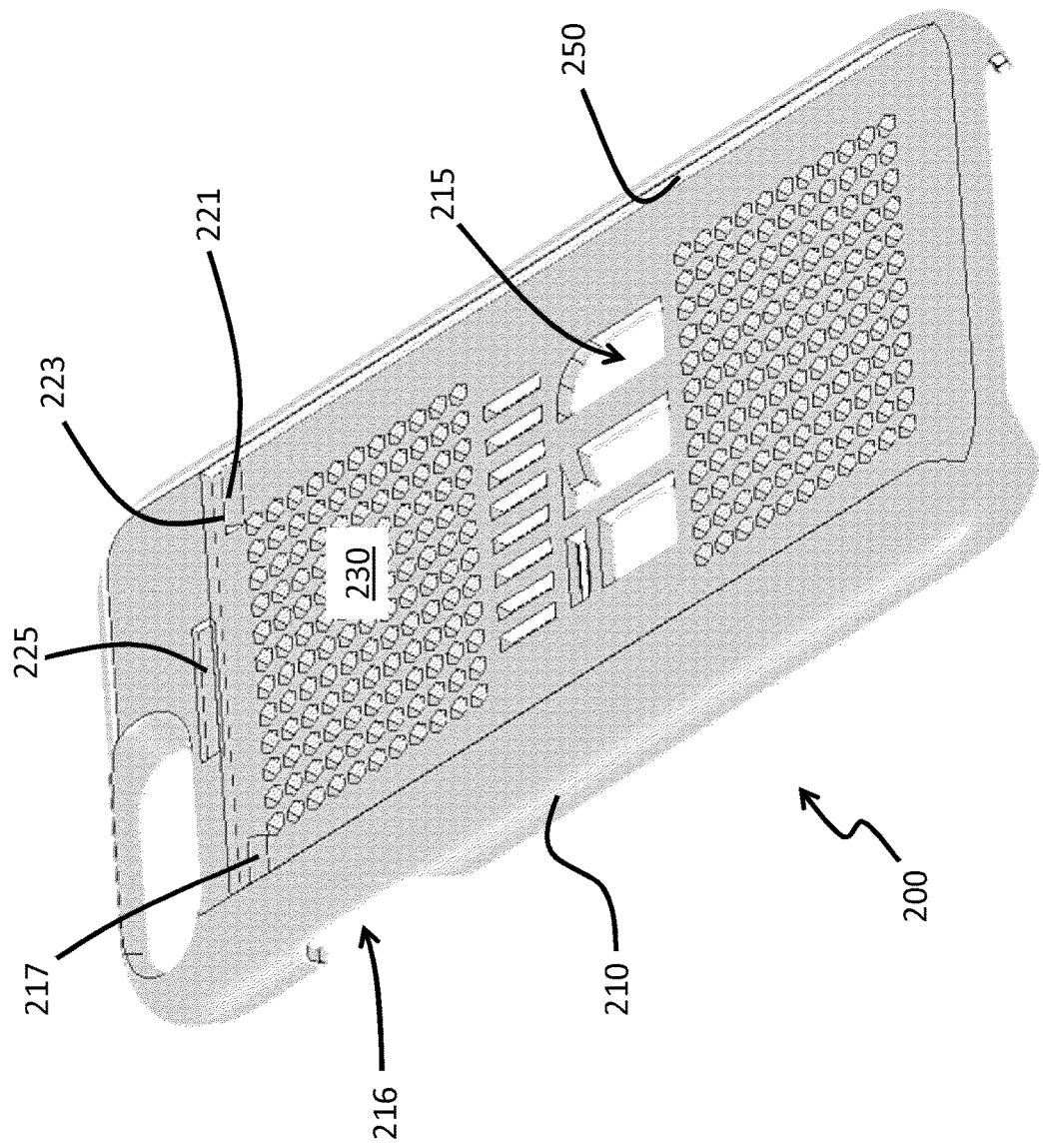
FIG. 6C is a rear perspective view of the phone case of FIG. 6A.

FIG. 6C shows a rear view of the phone case 200 shown in FIG. 6B. The phone case 200 can include a rail 250 that is similar to the rail 150 except as described differently below. The rail 250 can be adapted to receive a portion (e.g., flange, edge) of an attachment 254 (shown in FIG. 7A) to allow the attachment 254 to be attached to the phone case 200. The phone case 200 can include a stop 217 that is adapted to engage a slot 219 (shown in FIG. 7B) that is disposed on an attachment 254. The stop 217 and slot 219 can be adapted so that once the attachment 254 is seated onto the phone case 200, the stop 217 and slot 219 resist the attachment 254 from sliding toward the bottom edge of the phone case 200. For example, the stop 217 can have a bottom-facing surface 221 that is ramped to facilitate allowing the attachment 254 from sliding over the stop 217 in the direction of the top edge of the phone case 200. The stop 217 can have a top-facing surface 223 that is substantially perpendicular to the rear face 230 of the phone case 200, thereby providing an abutment surface that engages a corresponding surface on the slot 219 and resists the attachment 254 from sliding toward the bottom edge of the phone case 200 once the slot 219 is seated onto the stop 217. The stop 217 can be made of or include a flexible material (e.g., plastic), allowing a user to force the attachment past the stop 217. The phone case 200 can include a détente 225 that assists in fixing the attachment 254 to the phone case 200. The détente 225 can be a flexible lip or recess that engages a corresponding recess or lip on the attachment 254. The détente 225 can be adapted to allow the détente 225 to resist movement of the attachment 254 toward the bottom edge of the phone case 200 once corresponding portion of the attachment 254 is seated in the détente 225.

In various embodiments, phone case 200 comprises a latch. In various embodiments, phone case 200 comprises a pivot and lock. In various embodiments, phone case 200 comprises a snap fit. In various embodiments, phone case 200 comprises a snap lock. In various embodiments, phone case 200 comprises an attachment interface comprising a lever. In various embodiments, phone case 200 comprises an attachment interface comprising a release mechanism. In one embodiment, the release mechanism is a button. In one embodiment, the release mechanism is a slide. In one embodiment, the release mechanism is a toggle.

Figure 7A:
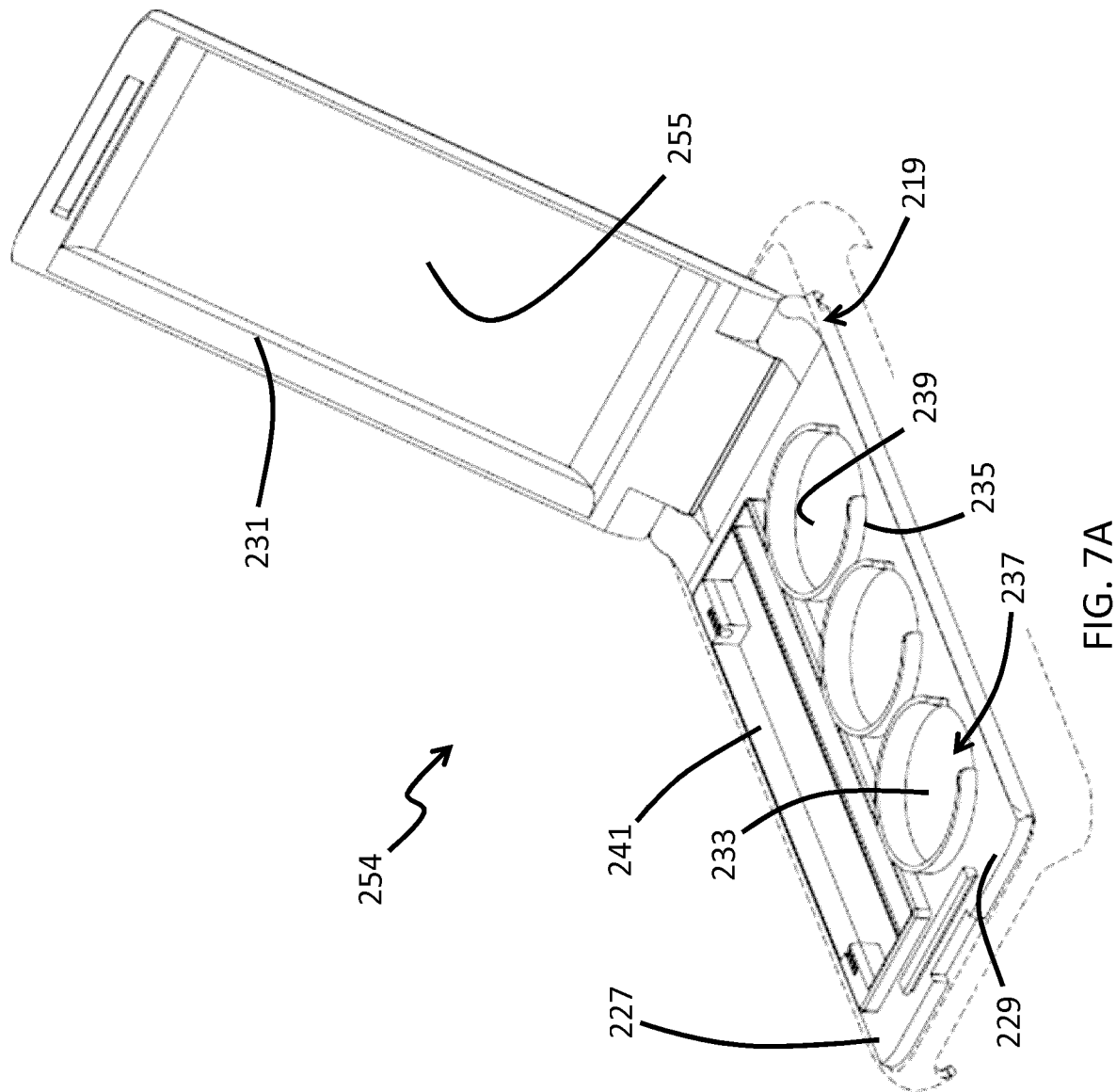
FIG. 7A is a top perspective view of an embodiment of a cosmetic compact attachment for a phone case.

FIG. 7A shows an embodiment of an attachment 254 that is a cosmetic compact case 227. The cosmetic compact case 227 can have a base 229 that is attached to a cover 231. The base 229 and the cover 231 can be attached to one another by a hinge that allows the cover 231 to be flipped open to allow access to cosmetics that are disposed in or on the base 229. The base 229 can have one, two, three, or more receptacles 233 for receiving cosmetics (e.g., in various embodiments, make-up, blush, foundation, lip coloring, lip gloss, lip stick, mascara, eye liner, eye shadow, lotion, skin conditioner, acne medication (e.g., benzoyl peroxide, salicylic acid, alpha hydroxy acid, sulfur, etc.), brush, swab, pencil, pen, highlighting, glitter, ink, implement, pad, wipe, and/or any other make-up related accessory, etc.). In some embodiments, the cosmetics are stored directly in the receptacle 233. In certain variants, the cosmetics can be stored in a removable insert that is sized to fit within the receptacle 233. For example, the insert can be removed and replaced with another insert to replenish the cosmetics or to customize the variety of cosmetics that are stored in the cosmetic compact case 227.

In the illustrated embodiment, the base 229 has three receptacles defined by a wall 235 that partially surrounds each receptacle 233. Because the wall 235 only surrounds a portion of the receptacle 233, an opening 237 is formed in the wall 235. The opening 237 can be adapted to facilitate the removal of a cosmetic-containing insert. For example, the opening 237 can be sized to allow a user to insert a finger through the opening 237 in order to pry the insert out of the receptacle 233. In some embodiments, the wall 235 can surround the entire circumference of receptacle 233. In certain configurations, the bottom surface 239 of the receptacle 233 can include a magnet that helps retain the cosmetic-containing insert within the receptacle 233. For example, the cosmetic-containing insert can have a metallic or magnetic bottom surface that reversibly attaches to the magnet on the bottom surface 239 of the receptacle 233. The cosmetic compact case 227 can have a bin 241 that is sized to hold a brush or other applicator for applying the cosmetics. In some embodiments, the bin 241 can be sized to hold tweezers, scissors, or other toiletry items. The cosmetic compact case 227 can include a mirror 255. In some embodiments, the mirror 255 is attached to the inside surface of the cover 231.

Figure 7B:
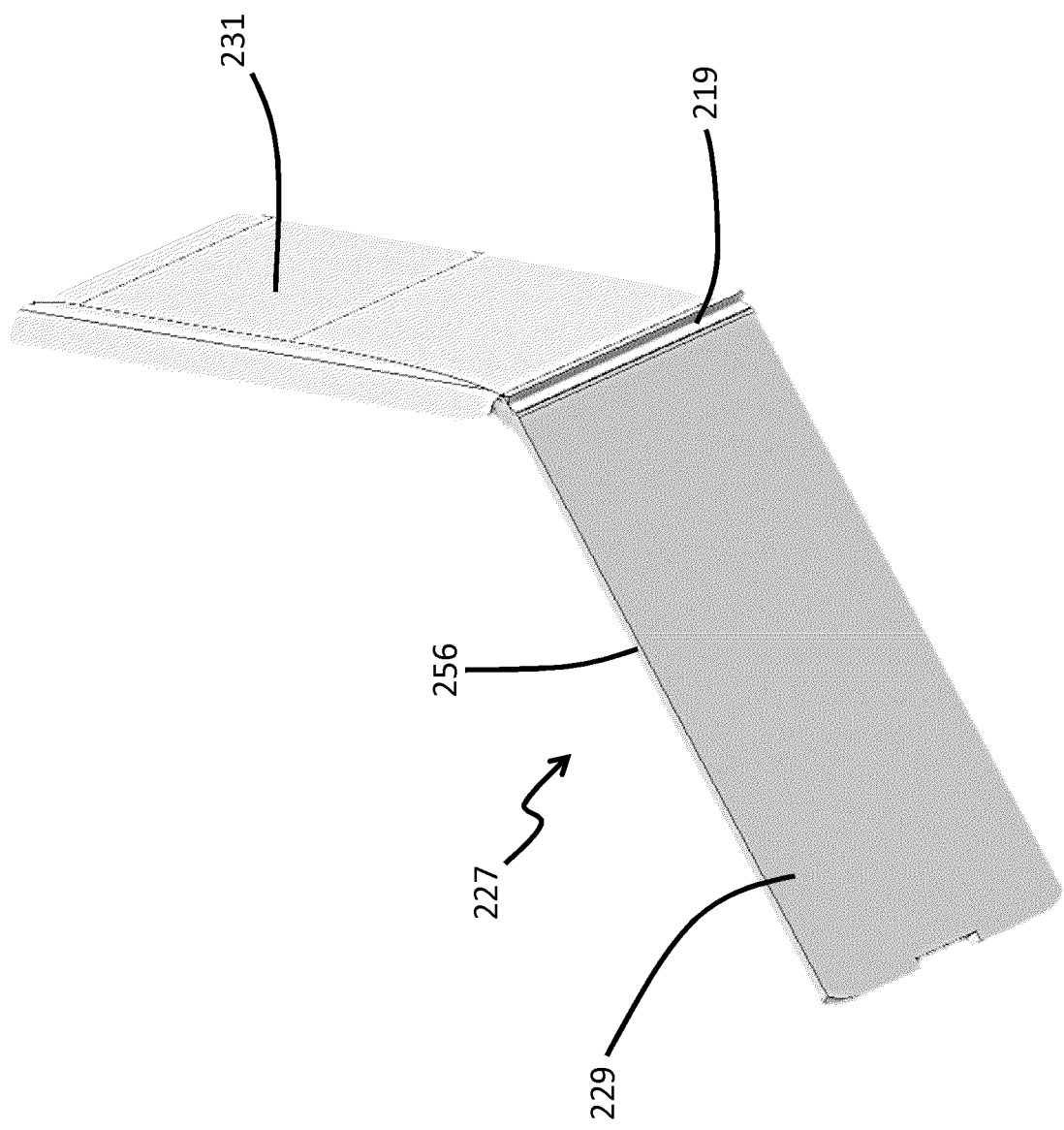
FIG. 7B is a bottom perspective view the attachment in FIG. 7A.

FIG. 7B is a bottom view of the cosmetic compact case 227 shown in FIG. 7A. As discussed, the base 229 of the cosmetic compact case 227 can include a slot 219 that engages the stop 217 on the phone case 200 to help the cosmetic compact case 227 attach to the phone case 200. In some embodiments, the side edges of the base 229 can include a flange 256 that engages the rail 250 of the phone case 200 to help attach the cosmetic compact case 227 to the phone case 200.

Figure 7C:
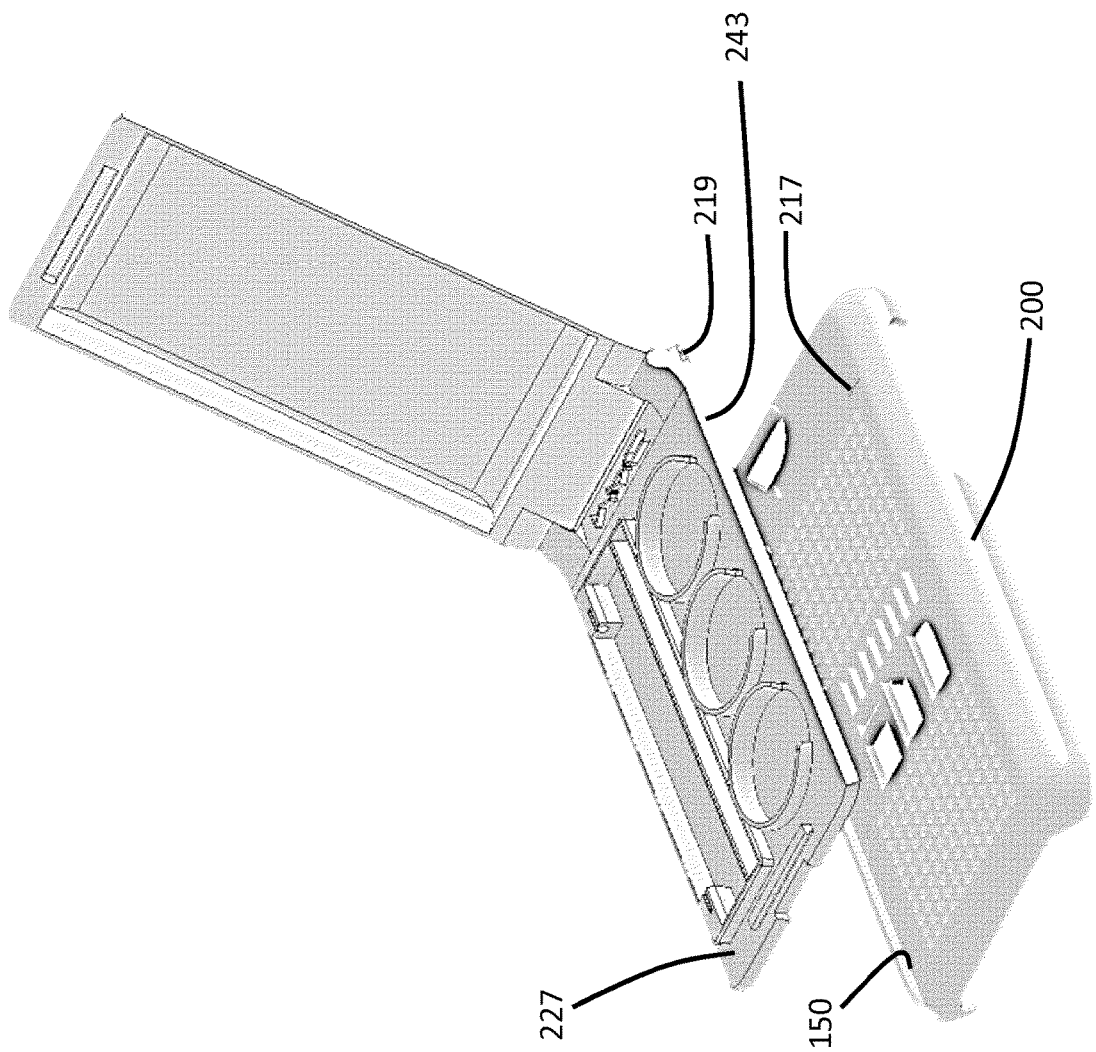
FIG. 7C is an exploded view the phone case in FIG. 6B and the attachment in FIG. 7A.

FIG. 7C is an exploded top view of the phone case 200 and the cosmetic compact case 227 assembly, illustrating how the cosmetic compact case 227 seats onto the phone case 200. In some embodiments, a lateral edge 243 of the cosmetic compact case 227 is inserted under the rail 250 of the phone case 200 at the bottom of the phone case 200. The cosmetic compact case 227 is then slid along the rail 250 toward the top edge of the phone case 200 to align the slot 219 of the cosmetic compact case 227 over the stop 217 of the phone case 200. In some configurations, the cosmetic compact case 227 is attached to the phone case 200 by inserting a lateral edge 243 of the cosmetic compact case 227 under the rail 250 of the phone case 200 and rotating the cosmetic compact case 227 toward the phone case 200 to deform the opposing rail 250 with the opposing lateral edge 243, thereby allowing the cosmetic compact case 227 to be snapped onto the phone case 200.

Figure 7D:
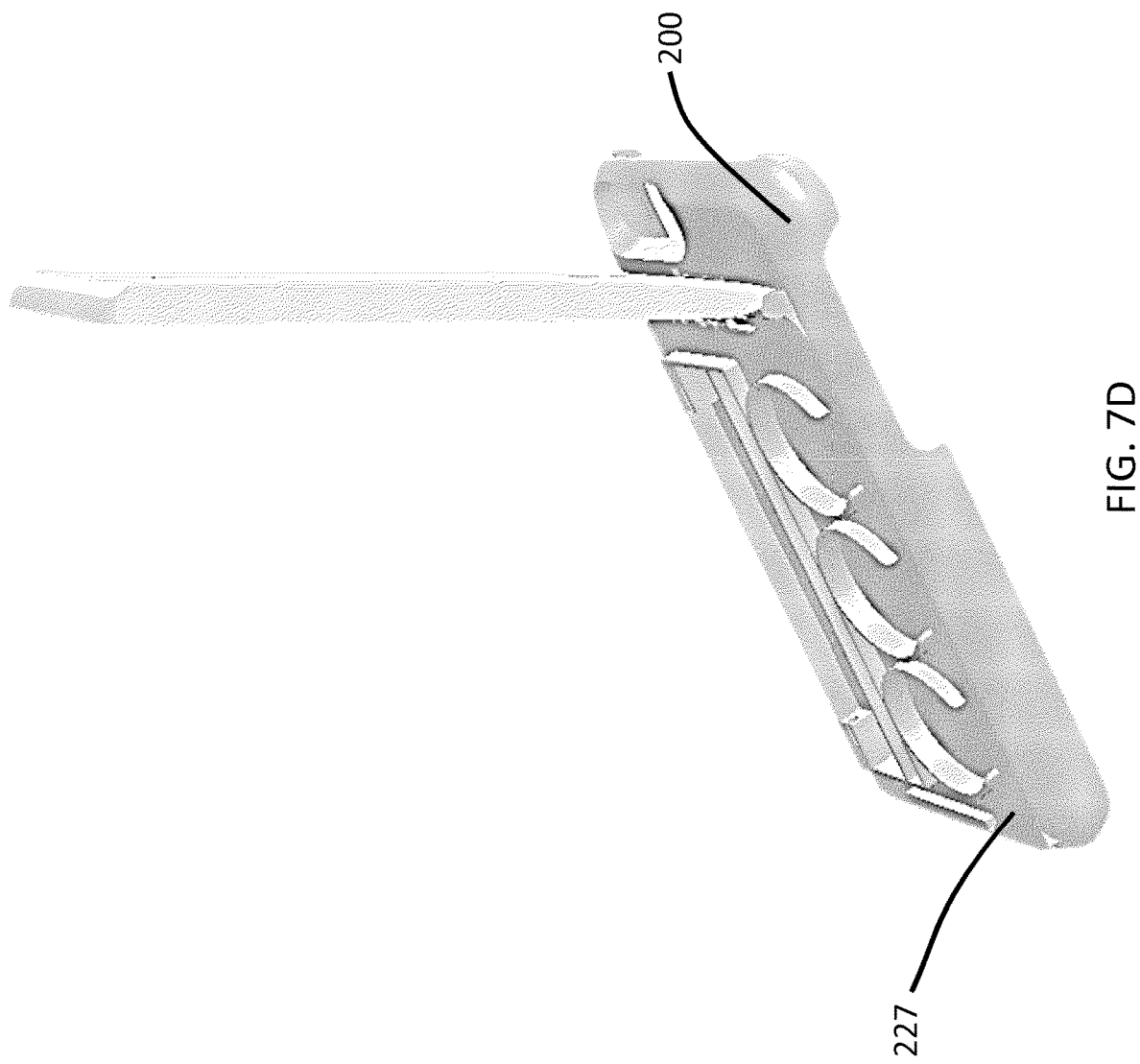
FIG. 7D is a top perspective view of the attachment in FIG. 7A attached to the phone case in FIG. 6B.
Figure 7E:
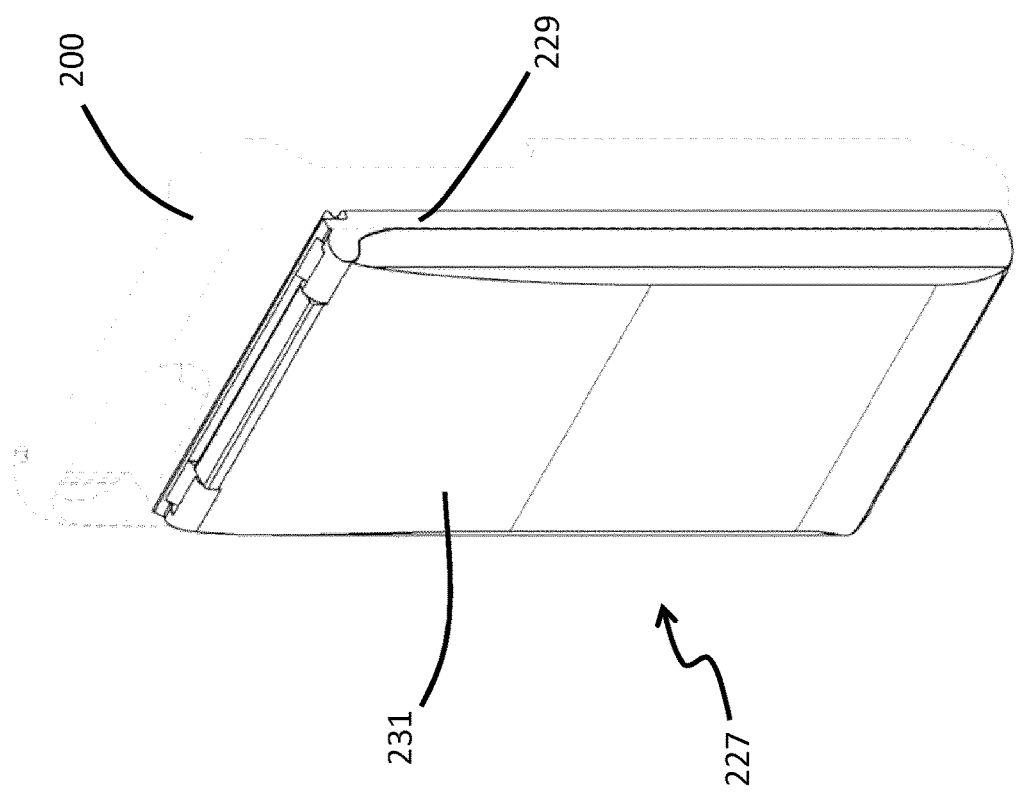
FIG. 7E is a top perspective view of the attachment in FIG. 7A attached to the phone case in FIG. 6B, illustrating the position of the cover when the cover is in the closed position.

FIG. 7D shows a partial top view of the cosmetic compact case 227 and the phone case 200 shown in FIG. 7C, with the compact case 227 attached to the phone case 200. FIG. 7E shows a partial side view of the cosmetic compact case 227 with the cover 231 in the closed position. In the illustrated embodiment, the cosmetic compact case 227 forms a sealed compartment when the cover 231 is closed onto the base 229 of the cosmetic compact case 227.

FIG. 8 shows another embodiment of the cosmetic compact case 227b attached to a phone case 200b. In the illustrated embodiment, the cosmetic compact case 227b has a shield 245 that is attached to the base 229b of the cosmetic compact case 227b. The shield 245 can be coupled to the base 229b by a hinge, allowing the shield 245 to be folded down onto the base 229b. The shield 245 can be sized so that the shield 245 covers the receptacles 233b when the shield 245 is folded down onto the base 229b. In the illustrated embodiment, the receptacles 233b are circular and the shield 245 is transparent. In some embodiments, the shield 245 is not transparent (e.g., opaque). In some configurations, the receptacles 233b have a shape other than circular (e.g., oval, rectangular, triangular, multiple sizes and/or orientations, sharp edges, rounded edges, vertices, straight lines, curved lines). As shown in FIG. 8A, the base 229b can include a latch 247 that is adapted to engage a recess 249 on the cover 231b to hold the cover 231b in the closed position until a user moves the latch 247 to unlock the cover 231b and allow the cover 231b to rotate away from the base 229b. In some embodiments, the latch 247 can be adapted to hold the shield 245 in a closed position until a user moves the latch 247 to unlock the shield 245. In some embodiments, the cosmetic compact case 227b has one latch for the cover 231b and a second latch for the shield 245. The shield 245 can be configured to protect the mirror 255 from getting scratched or soiled by cosmetics contained within the cosmetic compact case 227b. In some embodiments, the shield 245 can cover the receptacles 233b to protect the cosmetics from mixing with one another.

Figure 9B:
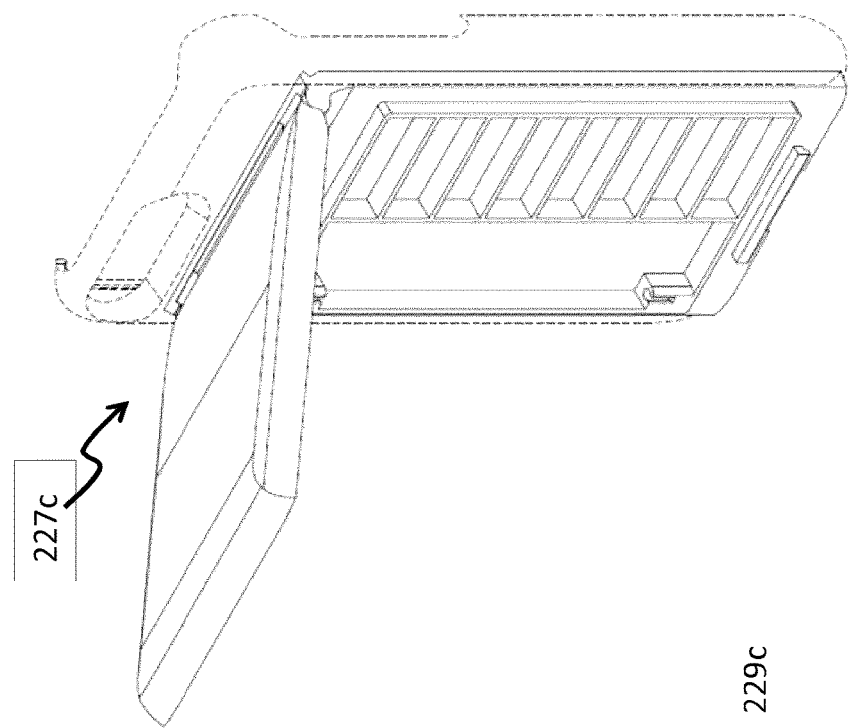
FIGS. 9A and 9B are a top perspective view and a side perspective view of an embodiment of a cosmetic compact attachment attached to a phone case.
Figure 9A:
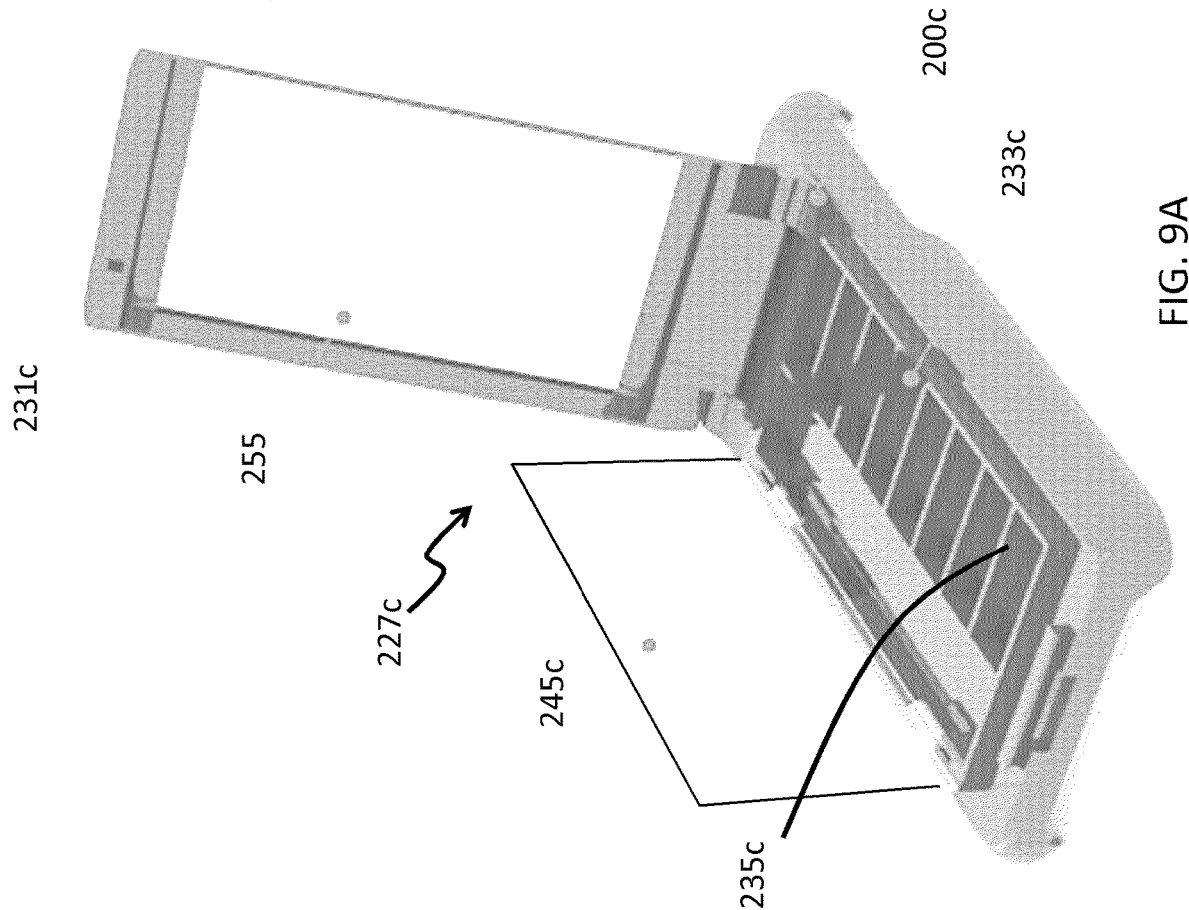

FIG. 9 shows another embodiment of the cosmetic compact case 227c attached to a phone case 200c. In the illustrated embodiment, the cosmetic compact case 227c has a shield 245c that is similar to the shield 245 except as described differently below. The cosmetic compact case 227 has receptacles 233c that are similar to the receptacles 233 and 233b except as described differently below. Each of the receptacles 233c is rectangular in shape and is entirely surrounded by a side wall 235c.

Figure 10:
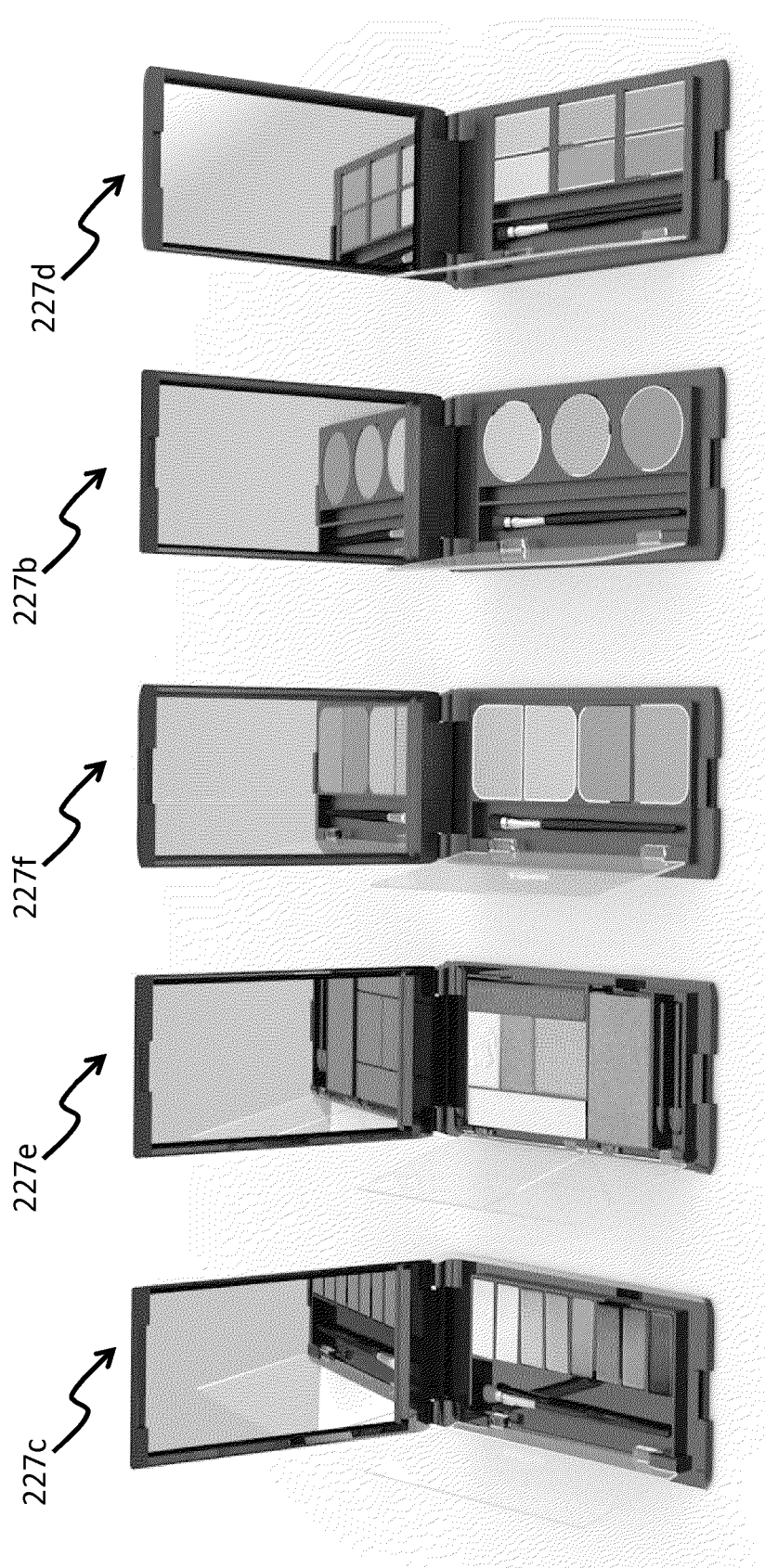
FIG. 10 is a top perspective view of various embodiments of an interchangeable cosmetic accessory attached to a phone case.

FIG. 10 shows multiple embodiments of cosmetic compact cases 227b, 227c, 227d, 227e, 227f configured for interchangeable attachment and detachment from a phone case 100, 200. In various embodiments, the cosmetic compact cases comprise a lid, mirror, shield, one or more make-up containers, one or more make-up application tools, one or more make-up removal tools, a lock, a latch, a button, a release toggle, a switch, a snap fit, a slide fit, an interlocking fit, icon, logo, trademark, image, photograph, pattern, embossing, and any combination with or without any of these features.

FIGS. 11A and 11B are a top perspective view of an embodiment of an interchangeable cosmetic accessory 227b with circular containers attached to a phone case with a transparent shield in an open and a closed configuration. In some embodiments, the interchangeable cosmetic accessory 227b comprises a mirror. In some embodiments, the interchangeable cosmetic accessory 227b comprises an application or removal tool, such as a brush, swap, or other tool. In some embodiments, the interchangeable cosmetic accessory 227b comprises one, two, three, or more circular containers for make-up, wherein the containers are configured for replaceable, interchangeable removal and insertion.

Figure 12B:
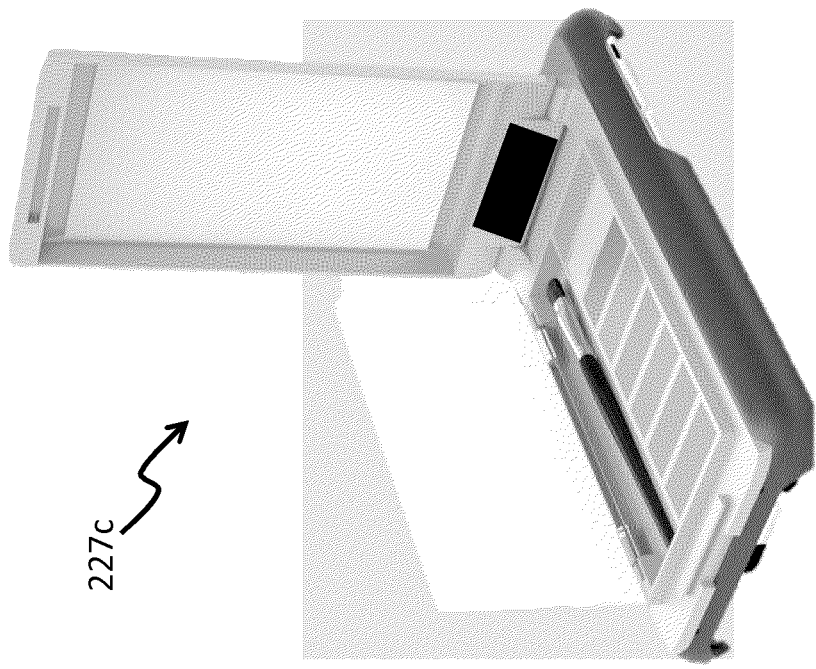
FIGS. 12A and 12B are a top perspective view of an embodiment of an interchangeable cosmetic accessory with a plurality of rectangular containers attached to a phone case with a transparent shield in an open configuration.
Figure 12A:
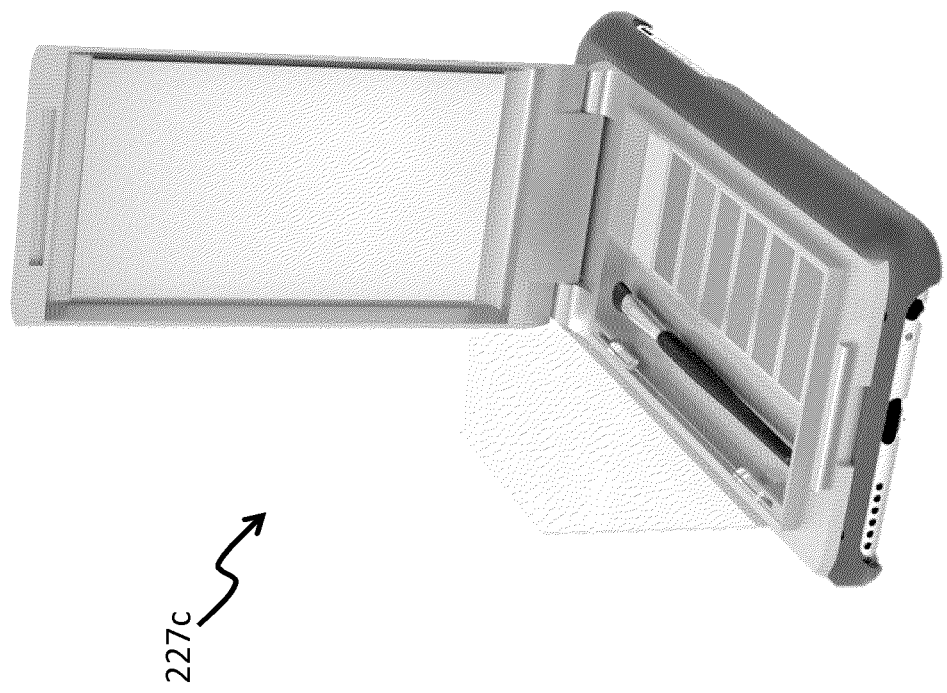
Figure 14B:
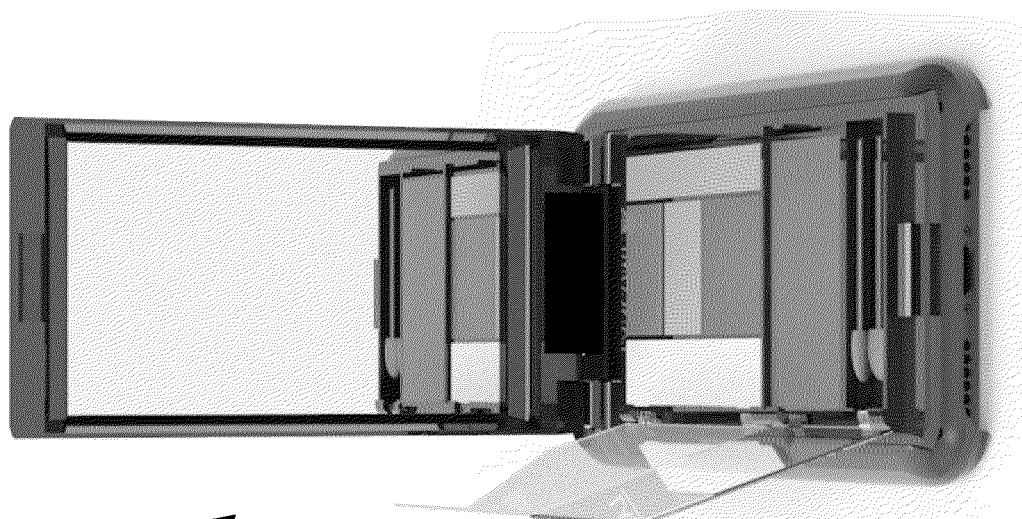
Figure 14A:
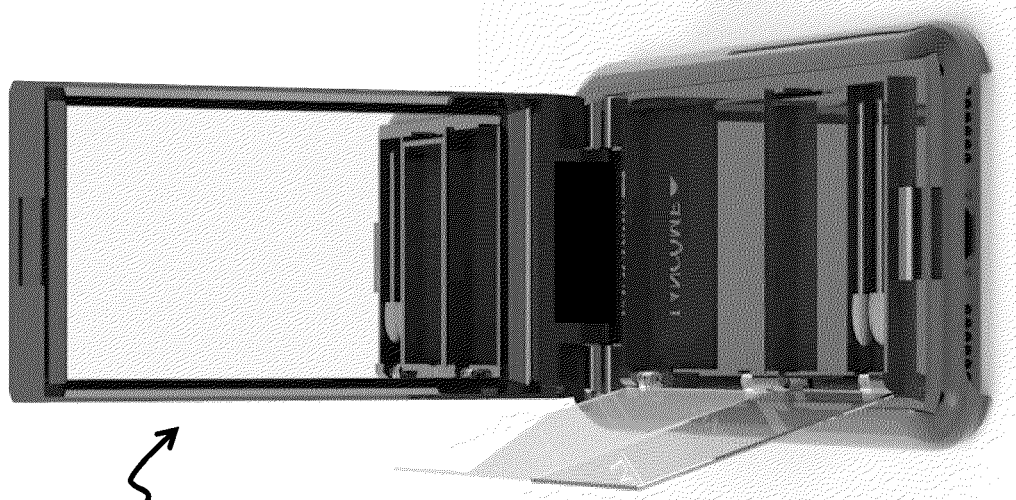

FIGS. 12A and 12B are a top perspective view of an embodiment of an interchangeable cosmetic accessory 227c with a plurality of rectangular containers attached to a phone case with a transparent shield in an open configuration. In some embodiments, the interchangeable cosmetic accessory 227c comprises a mirror. In some embodiments, the interchangeable cosmetic accessory 227c comprises an application or removal tool, such as a brush, swap, or other tool. In some embodiments, the interchangeable cosmetic accessory 227c comprises one, two, three, four, five, six, seven, eight, or more rectangular containers for make-up, wherein the containers or a panel of containers are configured for replaceable, interchangeable removal and insertion.

FIGS. 13A and 13B are a rear perspective view and top perspective view of an embodiment of an interchangeable cosmetic accessory 227d with a plurality of rectangular containers attached to a phone case with a transparent shield in an open configuration. In some embodiments, the interchangeable cosmetic accessory 227d comprises a mirror. In some embodiments, the interchangeable cosmetic accessory 227d comprises an application or removal tool, such as a brush, swap, or other tool. In some embodiments, the interchangeable cosmetic accessory 227d comprises one, two, three, four, five, six, or more rectangular containers for make-up, wherein the containers or a panel of containers are configured for replaceable, interchangeable removal and insertion.

FIGS. 14A, 14B, 14C and 14D are a front perspective views of an embodiment of an interchangeable cosmetic accessory 227e with attached to a phone case with an interchangeable, replaceable container shown in and out of the accessory. In some embodiments, the interchangeable cosmetic accessory 227e comprises a mirror. In some embodiments, the interchangeable cosmetic accessory 227e comprises an application or removal tool, such as a brush, swap, or other tool. In some embodiments, the interchangeable cosmetic accessory 227e comprises one, two, three, four, five, or more rectangular containers for make-up, wherein the containers or a panel of containers are configured for replaceable, interchangeable removal and insertion.

Figures 15A, 15B:
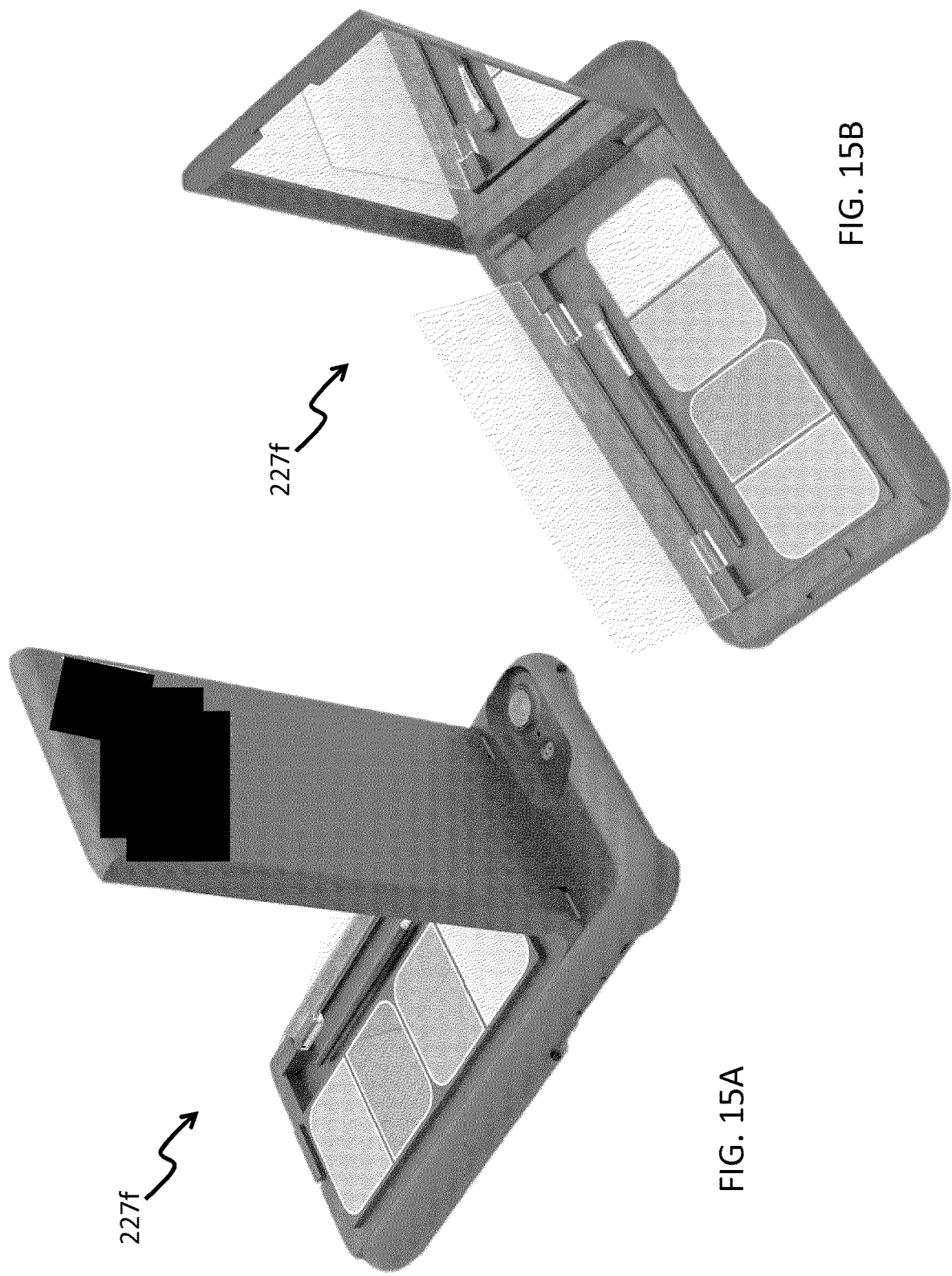
FIGS. 15A and 15B are a rear perspective view and top perspective view of an embodiment of an interchangeable cosmetic accessory with a plurality of rectangular containers with rounded corners attached to a phone case with a transparent shield in an open configuration.

FIGS. 15A and 15B are a rear perspective view and top perspective view of an embodiment of an interchangeable cosmetic accessory 227f with a plurality of rectangular containers with rounded corners attached to a phone case with a transparent shield in an open configuration. In some embodiments, the interchangeable cosmetic accessory 227f comprises a mirror. In some embodiments, the interchangeable cosmetic accessory 227f comprises an application or removal tool, such as a brush, swap, or other tool. In some embodiments, the interchangeable cosmetic accessory 227f comprises one, two, three, four, or more shaped containers for make-up, wherein the containers or a panel of containers are configured for replaceable, interchangeable removal and insertion.

Features, materials, characteristics, or groups described in conjunction with a particular aspect, embodiment, or example are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure.

Although the present disclosure includes certain embodiments, examples and applications, it will be understood by those skilled in the art that the present disclosure extends beyond the specifically disclosed embodiments to other alternative embodiments and/or uses and obvious modifications and equivalents thereof, including embodiments which do not provide all of the features and advantages set forth herein. Accordingly, the scope of the present disclosure is not intended to be limited by the specific disclosures of preferred embodiments herein, and may be defined by claims as presented herein or as presented in the future.

What is claimed is:
1. A phone case comprising:
an interchangeable cosmetic make-up accessory comprising a first flange and a second flange; and
a housing being configured to removably attach to a phone and the interchangeable cosmetic make-up accessory, the housing comprising:
a planar element comprising a front face and a rear face;
a first sidewall being disposed along a first lateral edge of the planar element, the first sidewall being substantially perpendicular to the planar element, the first sidewall comprising a front portion extending beyond the front face of the planar element and a rear portion extending beyond the rear face of the planar element;
a second sidewall being disposed along a second lateral edge of the planar element, the second sidewall being substantially perpendicular to the planar element, the second sidewall comprising a front portion extending beyond the front face of the planar element and a rear portion extending beyond the rear face of the planar element; and
an interface being configured to interchangeably attach the housing and the interchangeable cosmetic make-up accessory, the interface comprising:
a first groove being positioned at least partially along the front portion of the first sidewall and being configured to retain a first lateral edge of a phone,
a first rail being positioned at least partially along the rear portion of the first sidewall and being configured to engage the first flange of the inter- changeable cosmetic make-up accessory to couple the interchangeable cosmetic make-up accessory to the housing, a second groove being positioned at least partially along the front portion of the second sidewall and being configured to retain a second lateral edge of a phone, and a second rail being positioned at least partially along the rear portion of the second sidewall and being configured to engage the second flange of the interchangeable cosmetic make-up accessory to couple the interchangeable cosmetic make-up accessory to the housing, wherein the first rail is configured to align with the second rail, wherein the housing is configured to permit a user to access contents of the interchangeable cosmetic make-up accessory when the housing is removably attached to the interchangeable cosmetic make-up accessory.

2. The phone case of claim 1, wherein the interchangeable cosmetic make-up accessory comprises one or more of the group consisting of: blush, foundation, primer, lip coloring, lip gloss, lip stick, mascara, eye liner, and eye shadow.

3. The phone case of claim 1, wherein the interchangeable cosmetic make-up accessory comprises one or more of the group consisting of: lotion, skin conditioner, and acne medication.

4. The phone case of claim 1, wherein the interchangeable cosmetic make-up accessory comprises one or more of the group consisting of: a brush, a swab, a pad, and a wipe.

5. The phone case of claim 1, wherein the interchangeable cosmetic make-up accessory comprises one or more of the group consisting of: a make-up pencil, a make-up pen, a highlighting instrument, and glitter.

6. The phone case of claim 1, wherein the interface comprises a releasable locking mechanism for locking and releasing the interchangeable cosmetic make-up accessory from the housing.

7. The phone case of claim 6, wherein the locking mechanism is any one of the group consisting of a button, a slide, a toggle, a latch, a rail, and a snap fit.

8. The phone case of claim 1,
wherein the interface comprises the first rail and the second rail, the second rail being parallel to the first rail,
wherein the interchangeable cosmetic make-up accessory is configured to engage the first and second rail and removably couple to the housing.

9. A kit comprising:
a case being configured for attachment to a phone, the case comprising a housing, the housing comprising:
a planar element comprising a front face and a rear face;
a first sidewall being disposed along a first lateral edge of the planar element, the first sidewall being substantially perpendicular to the planar element, the first sidewall comprising a front portion extending beyond the front face of the planar element and a rear portion extending beyond the rear face of the planar element;
a second sidewall being disposed along a second lateral edge of the planar element, the second sidewall being substantially perpendicular to the planar element, the second sidewall comprising a front portion extending beyond the front face of the planar element and a rear portion extending beyond the rear face of the planar element; and
an interface comprising:
a first groove being positioned at least partially along the front portion of the first sidewall and being configured to retain a first lateral edge of the phone;
a first rail being positioned at least partially along the rear portion of the first sidewall;
a second groove being positioned at least partially along the front portion of the second sidewall and being configured to retain a second lateral edge of the phone; and
a second rail being positioned at least partially along the rear portion of the second sidewall,
wherein the first rail is configured to align with the second rail; and
an interchangeable cosmetic make-up accessory comprising a flange, the flange being configured to engage the first rail and the second rail to couple the interchangeable cosmetic make-up accessory to the case,
wherein the case is configured to permit a user to access contents of the interchangeable cosmetic make-up accessory when the case is coupled to the interchangeable cosmetic make-up accessory.

10. The kit of claim 9, wherein the interchangeable cosmetic make-up accessory comprises one or more of the group consisting of: blush, foundation, primer, lip coloring, lip gloss, lip stick, mascara, eye liner, eye shadow, lotion, skin conditioner, and acne medication.

11. The kit of claim 9, wherein the interchangeable cosmetic make-up accessory comprises one or more of the group consisting of: a brush, a swab, a pad, a wipe, a make-up pencil, a make-up pen, a highlighting instrument, and glitter.

12. The kit of claim 9, wherein the interface comprises a releasable locking mechanism for locking and releasing the interchangeable cosmetic make-up accessory from the housing, wherein the locking mechanism is any one of the group consisting of a button, a slide, a toggle, a latch, a rail, and a snap fit.

13. The kit of claim 9,
wherein the interface comprises a first rail and a second rail parallel to the first rail,
wherein the interchangeable cosmetic make-up accessory comprises a flange, wherein the flange is configured to engage the first and second rail and removably couple to the case.

* * * * *